US012739285B2

(12) United States Patent
Hoffpauir, IV

(10) Patent No.: US 12,739,285 B2
(45) **Date of Patent: *Sep. 15, 2026**

(54) METHODS AND APPARATUS FOR LAWFUL INTERCEPTION OF COMMUNICATIONS

(71) Applicant: Charter Communications Operating, LLC, St. Louis, MO (US)

(72) Inventor: Girard Hoffpauir, IV, Austin, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,496

(22) Filed: Jul. 24, 2023

(65) Prior Publication Data

US 2023/0388353 A1 Nov. 30, 2023

Related U.S. Application Data

(63) Continuation of application No. 17/327,692, filed on May 22, 2021, now Pat. No. 11,711,402.

(51) Int. Cl.
*H04L 67/563* (2022.01)
*H04L 9/40* (2022.01)
(Continued)

(52) U.S. Cl.
CPC ........ *H04L 63/306* (2013.01); *H04L 63/0435* (2013.01); *H04L 63/0876* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,605,629 | B1 * | 12/2013 | S | H04L 63/306 725/74 |
| 10,009,813 | B2 * | 6/2018 | Sirotkin | H04W 12/02 |
| 2009/0094245 | A1 * | 4/2009 | Kerns | G06F 16/113 707/999.009 |

(Continued)

OTHER PUBLICATIONS

A Comprehensive Overview of Government Hacking Worldwide. Li. IEEE. (Year: 2018).*

*Primary Examiner* — Venkat Perungavoor
(74) *Attorney, Agent, or Firm* — Straub & Straub; Michael P. Straub; Stephen T. Straub

(57) ABSTRACT

Lawful intercept is supported by providing a network communications device target identifiers in encrypted form. Received encrypted target identifiers are stored in a non-volatile storage device. Before communications interception occurs, one or more encrypted target identifiers are loaded into active memory which is secure and not accessible by a network device operating system administrator. A decryption request is sent to a security device and the result loaded into the secure active memory. Plain text target identifier(s) returned by the security device are loaded directly into the active memory without being stored in the operating system administrator accessible storage device. In the case of a reset resulting in the contents of the active memory being lost, the active memory is repopulated by sending decryption requests using the stored encrypted target identifiers to indicate to the security device the target identifiers which need to be decrypted and reloaded into active memory.

26 Claims, 15 Drawing Sheets

(51) Int. Cl.
*H04L 67/568* (2022.01)
*H04L 9/08* (2006.01)
*H04M 3/22* (2006.01)
*H04M 7/06* (2006.01)

(56) References Cited

U.S. PATENT DOCUMENTS

2010/0115018 A1* 5/2010 Yoon .................... H04L 63/126
709/201
2011/0145396 A1* 6/2011 Kim ....................... H04L 63/00
709/224
2011/0145888 A1* 6/2011 Park ....................... H04L 63/30
709/224
2012/0250584 A1* 10/2012 Jayaraman ........... H04W 12/80
370/259
2014/0286177 A1* 9/2014 Ni ......................... H04L 43/028
370/250
2015/0009864 A1* 1/2015 Kim .................... H04M 3/2281
370/259
2015/0074396 A1* 3/2015 Naslund ............. H04L 63/0428
713/168
2016/0006713 A1* 1/2016 Holtmanns ......... H04L 63/0428
713/168
2018/0019871 A1* 1/2018 Gage ................... G06F 21/6209
2018/0205763 A1* 7/2018 Seetharaman .......... H04L 63/30
2019/0387397 A1* 12/2019 Cao ......................... H04L 12/66
2021/0144184 A1* 5/2021 Wong .................. H04L 65/1069
2022/0377113 A1* 11/2022 Hoffpauir, IV ..... H04L 63/0435
2023/0007052 A1* 1/2023 Attanasio ............ H04M 3/2281
2023/0254347 A1* 8/2023 Orabona ............... H04L 63/306
370/259
2024/0031816 A1* 1/2024 Nakarmi ............... H04L 63/306

* cited by examiner

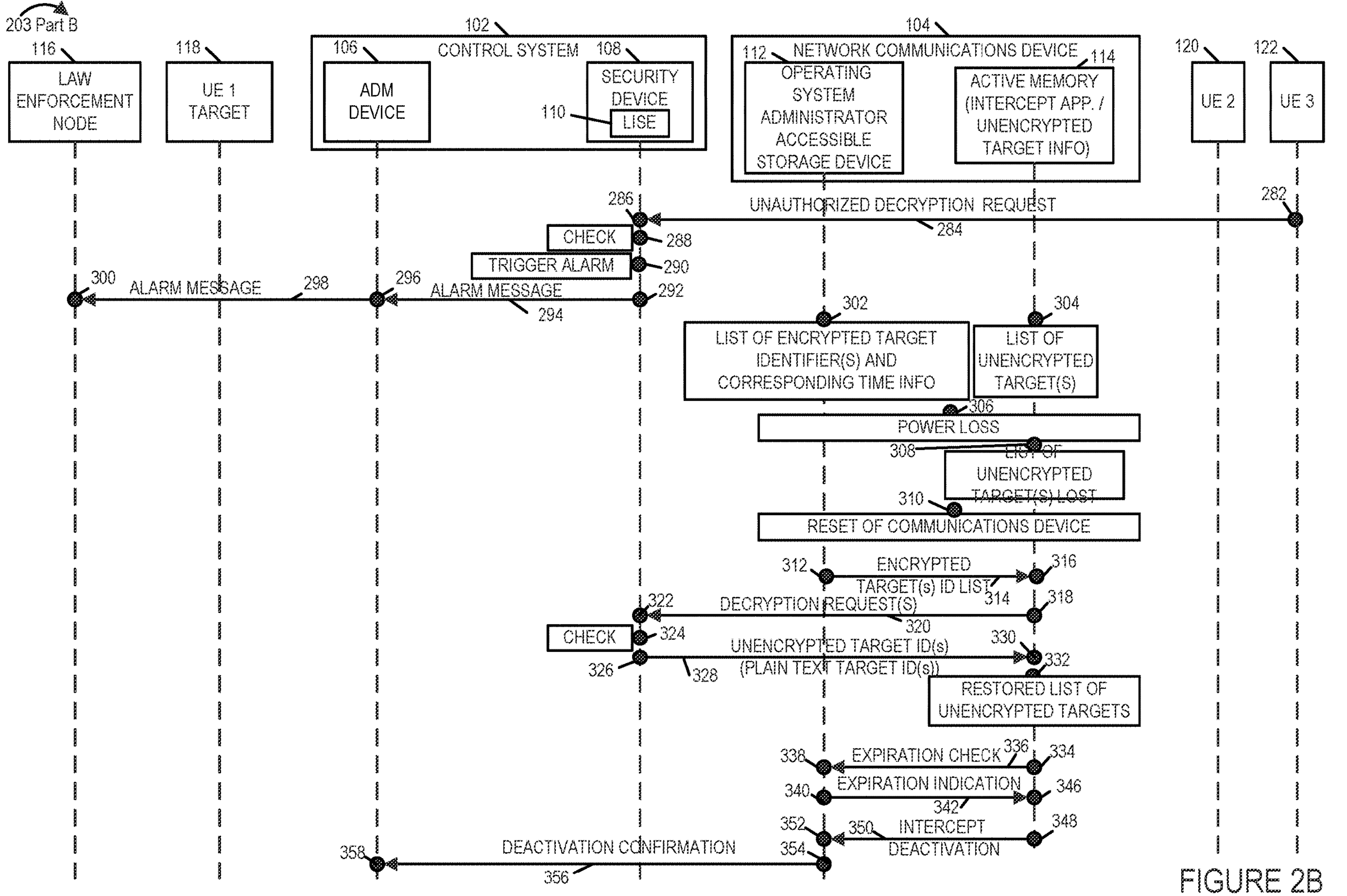
203 Part B
LAW ENFORCEMENT NODE
UE 1 TARGET
CONTROL SYSTEM
ADM DEVICE
SECURITY DEVICE
LISE
NETWORK COMMUNICATIONS DEVICE
OPERATING SYSTEM ADMINISTRATOR ACCESSIBLE STORAGE DEVICE
ACTIVE MEMORY (INTERCEPT APP. / UNENCRYPTED TARGET INFO)
UE 2
UE 3
UNAUTHORIZED DECRYPTION REQUEST
CHECK
TRIGGER ALARM
ALARM MESSAGE
ALARM MESSAGE
LIST OF ENCRYPTED TARGET IDENTIFIER(S) AND CORRESPONDING TIME INFO
LIST OF UNENCRYPTED TARGET(S)
POWER LOSS
LIST OF UNENCRYPTED TARGET(S) LOST
RESET OF COMMUNICATIONS DEVICE
ENCRYPTED TARGET(s) ID LIST
DECRYPTION REQUEST(S)
CHECK
UNENCRYPTED TARGET ID(s) (PLAIN TEXT TARGET ID(s))
RESTORED LIST OF UNENCRYPTED TARGETS
EXPIRATION CHECK
EXPIRATION INDICATION
INTERCEPT DEACTIVATION
DEACTIVATION CONFIRMATION
FIGURE 2B

| FIGURE 2A |
| --- |
| FIGURE 2B |

FIGURE 2

| FIGURE 8A |
| --- |
| FIGURE 8B |
| FIGURE 8C |

1003

ASSEMBLY OF COMPONENTS (INCLUDED IN A NETWORK COMMUNICATIONS DEVICE) (PART B)

1056 COMPONENT CONFIGURED TO OPERATE THE NETWORK COMMUNICATIONS DEVICE TO INTERCEPT COMMUNICATIONS PASSING THROUGH THE NETWORK COMMUNICATIONS DEVICE CORRESPONDING TO THE TARGET

1064 COMPONENT CONFIGURED TO OPERATE THE NETWORK COMMUNICATIONS DEVICE TO INTERCEPT COMMUNICATIONS PASSING THROUGH THE NETWORK COMMUNICATIONS DEVICE CORRESPONDING TO THE TARGET(S)

1058 COMPONENT CONFIGURED TO OPERATE THE NETWORK COMMUNICATIONS DEVICE TO PROVIDE A COPY OF THE INTERCEPTED COMMUNICATIONS TO ANOTHER DEVICE CORRESPONDING TO AN ENTITY AUTHORIZED TO ACCESS THE INTERCEPTED COMMUNICATIONS CORRESPONDING TO THE TARGET

1066 COMPONENT CONFIGURED TO OPERATE THE NETWORK COMMUNICATIONS DEVICE TO PROVIDE A COPY OF INTERCEPTED COMMUNICATIONS TO ANOTHER DEVICE CORRESPONDING TO AN ENTITY AUTHORIZED TO ACCESS THE INTERCEPTED COMMUNICATIONS CORRESPONDING TO A TARGET

1024 COMPONENT CONFIGURED TO OPERATE THE NETWORK COMMUNICATIONS DEVICE TO MONITOR FOR A RESET

1026 COMPONENT CONFIGURED TO DETECT RESET

1028 COMPONENT CONFIGURED TO DETERMINE IF THERE IS A STORED LIST OF ENCRYPTED TARGET IDENTIFIERS IN THE NETWORK COMMUNICATIONS DEVICE AND TO CONTROL OPERATION AS A FUNCTION OF THE DETERMINATION

1030 COMPONENT CONFIGURED TO OPERATE THE NETWORK COMMUNICATIONS DEVICE TO LOAD THE ENCRYPTED TARGET IDENTIFIER(S) FROM THE STORED LIST INTO MEMORY INCLUDED IN THE NETWORK COMMUNICATIONS DEVICE USED BY AN ACTIVE COMMUNICATIONS INTERCEPTION APPLICATION EXECUTING ON A PROCESSOR INCLUDED IN THE NETWORK COMMUNICATIONS DEVICE

1032 COMPONENT CONFIGURED TO OPERATE THE NETWORK COMMUNICATIONS DEVICE, UNDER CONTROL OF THE INTERCEPTION APPLICATION, TO SEND A DECRYPTION REQUEST SEEKING DECRYPTION OF THE ENCRYPTED TARGET IDENTIFIER(S), IDENTIFYING THE COMMUNICATIONS INTERCEPTION TARGET(S), TO THE SECURITY DEVICE

1034 COMPONENT CONFIGURED TO INCLUDE AN INDICATOR IN THE DECRYPTION REQUEST INDICATING THAT THE DECRYPTION REQUEST IS IN RESPONSE TO A RESET

FIGURE 9B

| FIGURE 9A | FIGURE 9A |
|---|---|

FIGURE 9

METHODS AND APPARATUS FOR LAWFUL INTERCEPTION OF COMMUNICATIONS

RELATED APPLICATIONS

The present application is a continuation of U.S. patent application Ser. No. 17/327,692 filed May 22, 2021 which was Published on Nov. 24, 2022 as Publication No.: US 2022-0377113 A1 and which is hereby expressly incorporated by reference in its entirety.

FIELD

The present application relates to lawful targeted interception of communications and, more particularly, to methods and apparatus of intercepting communications while reducing the risk of disclosure of the identity of one or more interception targets to individuals with access to network devices being used to implement interception of communications.

BACKGROUND

Law enforcement is allowed to legally intercept the communications of various entities, including individuals and business, under certain circumstances. For example, a court order, warrant or law may authorize the legal monitoring of communications of one or more entities for any of variety of reasons including, e.g., reasonable suspicion of involvement in illegal activity.

In order to implement communications interception, information identifying the target(s) of a lawful intercept are normally communicated in plain text form to one or more network devices where the communications interception can be implemented. To support the lawful intercept to be supported at a communications device, a plain text list of target identifiers is normally stored on one or more of the network devices which may be used to implement the interception.

System administrators of network devices normally have access, e.g., as operating system administrators, to the text files stored on the network devices on which they operate as system administrators. From a law enforcement perspective, this presents a problem in that operating system administrators can, in many cases, access the list of lawful intercept targets stored on a network device and potentially warn one or more of the targets that they are a communications interception target.

In such a system where interception targets are stored on network devices in plain text form, criminals can target administrators, e.g., operating system administrators of network devices, and attempt to bribe or force them into providing information about interception targets based on the information accessible to such administrators.

The provisioning of network devices with interception target information is a technical problem relating to the field of communications with security issues associated with it.

It would be desirable if methods and/or apparatus could be developed which would allow for lawful interception target information to be provided to, stored in and/or used by network devices in a way that facilitates interception of communications passing through such devices while also protecting the information identifying the targets from being easily accessed and understood by operating system administrators of the network devices. While not necessary for all embodiments, it would also be desirable if lawful interception techniques could be implemented in a way that would facilitate detection of unauthorized attempts to obtain access to information identifying the targets subject to communications interception so that such attempts can be blocked and/or law enforcement made aware of the unauthorized attempts to access such information.

SUMMARY

Methods and apparatus for protecting information, identifying targets of lawful communications interception targets, that can be loaded into and stored on network devices where interception may occur are described. In various embodiments information identifying interception targets in encrypted form in storage accessible to one or more administrators, e.g., operating system administrators, with access to the network device(s) used to implement communications interception. In such embodiments even if the information is accessed the identity of the targets is not disclosed since the accessed information is in encrypted form. To allow the target information to be used by a network device operating as a point of interception, the encrypted information identifying one or more interception targets is loaded into active memory of a network device. The network device maybe, and sometimes is, a switch, router or other device that is used to intercept data corresponding to one or more communications sessions passing through the network device. The contents of the active memory, unlike the storage device, which is accessible to an operating system administrator, is secure and not directly accessible to the administrator, e.g., operating system administrator. In various embodiments the active memory includes an interception application which includes instructions which when executed by a processor in the network device control the network device to perform one or more communications interception related operations.

In one exemplary embodiment interception target information is supplied from a control system, e.g., from an administrative device or function of a control system, in encrypted form, into the operating system administrator accessible storage device of the network communications device, which is to act as a point of interception (POI). The processor of the network communications device, under control of the interception application being executed by the processor, then loads the encrypted interception target information into active memory. The contents of active memory are not accessible to the operating system administrator. In various embodiments interception time period information is supplied with the target information and stored in the storage device with the received encrypted target identifier or identifiers. The interception time period information may be in the form of a validity time indicating the amount of time for which interception is to occur or a date and/or time range during which interception of communications corresponding to the supplied target identifier is to be implemented.

The encrypted target information is then sent from the active memory, as part of a decryption request, to the security device of the control system. The security device checks the decryption request in some, but not necessarily all, embodiments to determine if it is an expected request. In some embodiments this involves checking if the request is from a network communications device, which was supplied the encrypted target identifier which is being requested to be decrypted, and if the request is being made for a time period in which the target is to be monitored. If the request is from a device which was not provided the encrypted target identifier or is being made for a time period in which the target is not to be monitored by the device sending the decryption request, an alarm message is generated, and the security device does not provide the decrypted target information since the request is likely from a malicious device or entity, which is not authorized to receive the target information.

It should be appreciated that the security device will expect to receive one decryption request from each network communications device to which a particular target identifier was sent unless the device is rebooted or reset for some reason, e.g., due to a power glitch or failure which caused the active memory to be reset requiring re-acquisition of unencrypted versions of the previously received plain text target identifiers. To avoid confusion, in some embodiments, the network device sending a decryption request sends, with the decryption request, an indicator whether the decryption request is an initial decryption request for the identifier being sent or a request due to a reset or other operation requiring the network device to repopulate its active memory with plain text versions of encrypted target information it previously received but which were deleted from active memory for some reason such as a power glitch or hardware fault.

In cases where a received decryption request is unexpected, a response will not be provided and an alarm will be generated as noted above. However, in cases where the decryption request was expected, e.g., an initial encryption request for a supplied encrypted target identifier or a request due to a memory reset at a device which was supplied the encrypted identifier, the security device returns a plain text version of the target identifier to the network communications device which is stored in the active memory without being made accessible to the operating system administrator. Once stored, e.g., loaded, into active memory the plain text target identifier is used by the interception application to identify one or more communications sessions to be intercepted.

The interception application monitors communication sessions for the target identifier or identifiers stored in active memory. Upon detecting a communications session corresponding to a target identifier in active memory, the interception application, running at the network communications device, intercepts, e.g., copies, data in a communication session corresponding to the detected target identifier and provides it to another device for storage. The another device in some embodiments is part of the control system, e.g., an administrative device of the control system, which stores the intercepted content and makes it available to law enforcement entities. In response to an authorized request for content corresponding to an identified target, the administrator device provides the stored content of the intercepted communications session, corresponding to the target identifier supplied by law enforcement, to a law enforcement entity. In various embodiments this involves a request for content from a law enforcement node being received by an administrator device, said request for content including an identifier corresponding to an interception target, and the administrator device returns stored content corresponding to an intercepted communications session in response to the request for intercepted content.

The set of target identifiers received by the network communications device are stored in encrypted form in the storage device to facilitate reloading of active memory in the network communications device in the event the plain text versions of the intercept target identifiers are lost from active memory due to a power glitch of for other reasons causing a memory reset.

In the case of a memory reset, the encrypted target list is loaded into active memory, and a decryption request is sent to the security device seeking decryption of one or more encrypted target identifiers. In some embodiments the decryption request sent due to a reset includes information indicating that the request is a reset related request. In this way the security device knows that the request should not be simply ignored or disregarded as an unexpected repeat request for decryption of one or more target identifiers.

Assuming the security device determines the request for decryption to be valid, the security device returns one or more plain text target identifiers which are used to repopulate the active memory as part of the reset and thereby enable interception without requiring the network communications device to be resupplied with the encrypted list of target identifiers.

In various embodiments the network communications device determines when a monitoring time period corresponding to a target identifier has expired and deletes the encrypted version of the target identifier stored in the storage device and the plain text version of the target identifier from the active memory upon expiration of the corresponding monitoring interval. In this way target identifiers are removed from the non-volatile storage device and active memory when they are no longer to be used.

An exemplary communications interception method, in accordance with some embodiments, comprises: receiving, at a network communications device through which communication passes, an encrypted first target identifier identifying a first communications interception target; storing the encrypted first target identifier in a storage device accessible to an operating system of the network communications device and an operating system administrator of the network communications device; loading the encrypted first target identifier into memory included in the network communications device used by an active communications interception application executing on a processor included in the network communications device; operating the network communications device, under control of the interception application, to send a decryption request seeking decryption of the encrypted first target identifier, identifying the first communications interception target, to a security device; and operating the network communications device to receive an unencrypted version of the first target identifier and to load the unencrypted version of the first target identifier into said memory used by active communications interception application without making the unencrypted version of the first target identifier available to the operating system administrator of the network communications device.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 2B is a second part of a signaling diagram illustrating an exemplary communications method in accordance with an exemplary embodiment.

FIG. 2 comprises the combination of FIG. 2A and FIG. 2B.

FIG. 9B is a second part of a drawing of an exemplary assembly of components which may be included in an exemplary network communications device in accordance with an exemplary embodiment.

FIG. 9 comprises the combination of FIG. 9A and FIG. 9B.

DETAILED DESCRIPTION

Figure 1:
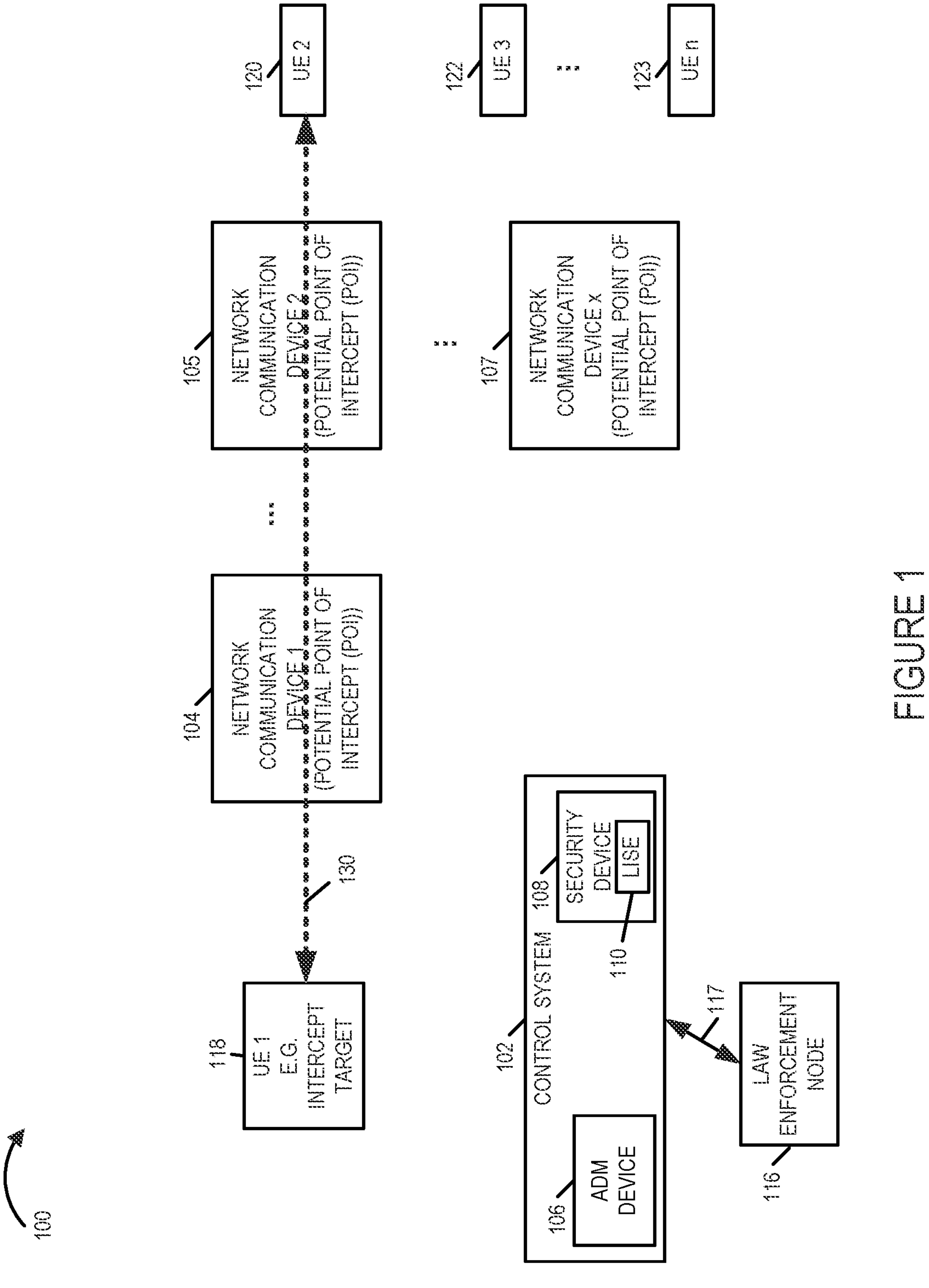
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a control system 102 including an administrative device 106 and a security device 108. In various embodiments, the security device 108 is or includes a Lawful Intercept Secrets Engine 110. The administrative device 108 and the security device 108 are, in some embodiments, within the same security realm. The control system 102 is coupled, via link 117, to a law enforcement node 116, which is a source of requested communications interception targets and a recipient of intercepted communications corresponding to the targets. Exemplary communications system 100 further includes a plurality of communications devices, e.g. end node communications devices (user equipment (UE) 1 118, UE 2 120, UE 3 122, . . . , UE n 123). At least some of the end node communications devices are mobile devices which may move throughout the communications system. Exemplary communications system 100 further includes a plurality of network communications devices (network communications device 1 104, network communications device 2 105, . . . , network communications device X 107), e.g., routers, switches, servers, core node devices, etc., through which communications may pass and which may, and sometimes do, operate as a point of interception (POI) regarding communications in the system 100.

In the example, of FIG. 1, UE 1 118, e.g., a selected target for interception, is shown in a communications session with UE 2 120 and communications are flowing over exemplary communication path 130. Communication path traverses network communication device 1 104 and network communication device 2 105.

Figure 2A:
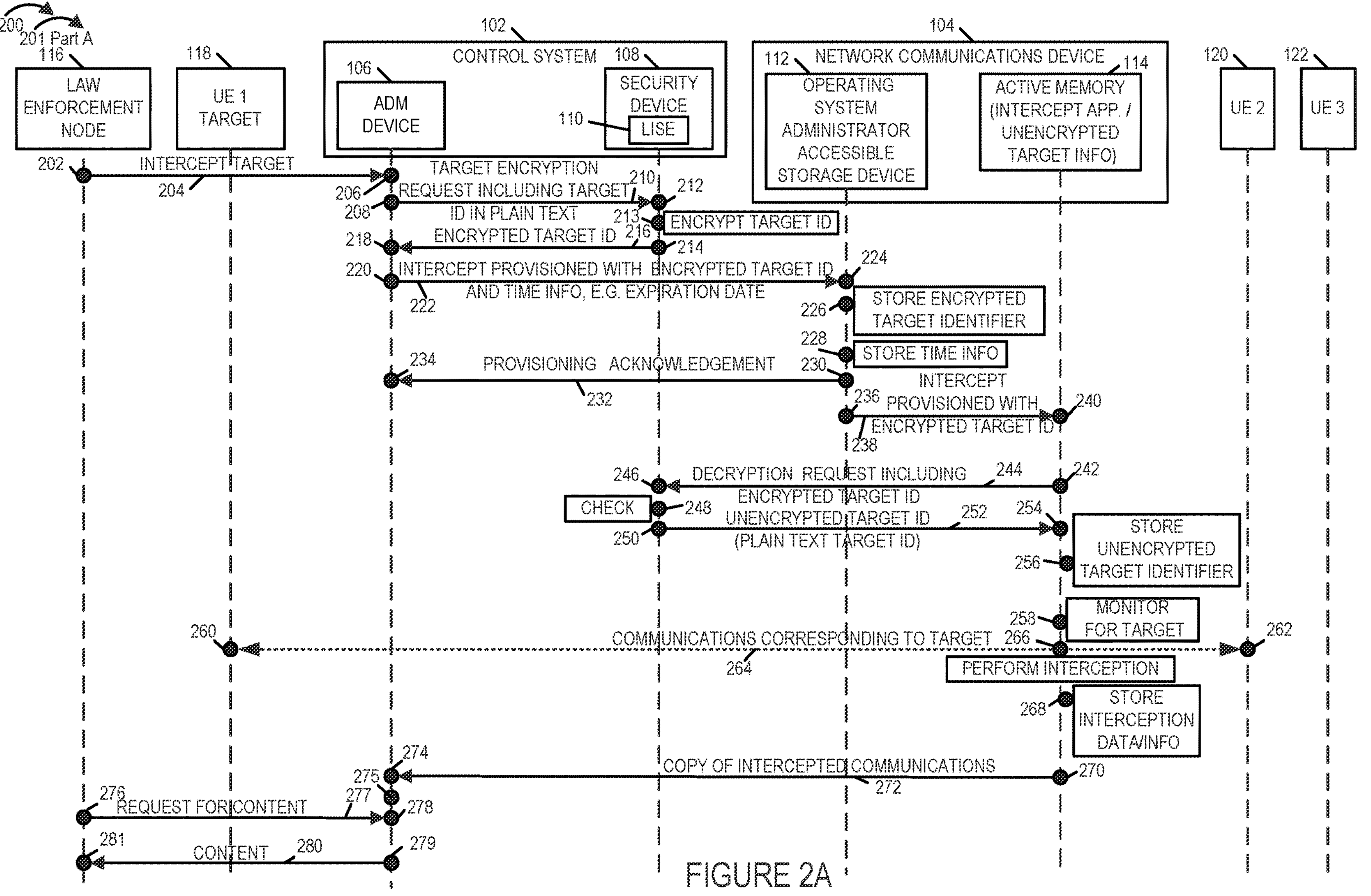
FIG. 2A is a first part of a signaling diagram illustrating an exemplary communications method in accordance with an exemplary embodiment.

FIG. 2, comprising the combination of FIG. 2A and FIG. 2B, is an exemplary signaling diagram 200, comprising Part A 201 and Part B 203, illustrating an exemplary communications interception method in accordance with an exemplary embodiment. Exemplary components from system 100 of FIG. 1 are used in signaling drawing 200 of FIG. 2.

Exemplary signaling diagram 200 includes control system 102, network communication device 104, a law enforcement node 116, user equipment (UE) device 1 118, UE device 2 120, and UE device 3 122. Control system 102 includes an administrator (ADM) device 106 and a security device 108. The security device 108 is or includes a Lawful Intercept Secrets Engine (LISE) 110. Network communications device 104 includes an operating system administrator accessible storage device 112 and an active memory 114. Storage device 112, which is accessible by a system administration of network communications device 104, includes memory, e.g., non-volatile memory, which may, and sometime does, include an encrypted list of communications intercept targets and corresponding time information indicating when the intercepts are to be performed. Active memory 114, e.g., a volatile memory, included in network communication device 104, may, and sometimes does, include a loaded copy of an intercept application and unencrypted target information, e.g., a list of one or more unencrypted identifiers corresponding to communications intercept targets. The active memory 104 is not accessible by the system administrator of network communications device 104. UE 1 118 is an end point device, which is also an exemplary first target, whose communications are to be intercepted. UE 2 120 is an end point device, which participates in a communications session with UE 1 118. UE 3 122 is an exemplary malicious or rogue node which sends an unauthorized request for decryption to the security device 108.

In step 202, law enforcement node 202 generates and sends an intercept target request message 204 to administrator device 106 of control system 102, requesting that communications corresponding to a target included in message 204 be intercepted. In step 108 administrator device 106 receives the intercept target request message 204 and recovers or determines an intercept target identifier (ID) based on the received message 204, e.g., receives an intercept target ID in the received message 204 or obtains an intercept target ID corresponding to the intercept target, e.g., matches a received name/address, phone number and/or e-mail address with a stored identifier, e.g., a device identifier. In step 208 the administrator device 106 generates and sends a target encryption request message 210 including a target ID in plain text to security device 108. In step 212 the security device 108 receives the target encryption request 210 and recovers the unencrypted target identifier. In step 213 the security device 108 encrypts the target identifier generating an encrypted target identifier, e.g., ciphertext conveying the intercept target identifier. In step 214, the security device 108 generates and sends message 216 communicating the encrypted target ID, to the administrator device 106. In step 218 the administrator device 106 receives message 216 and recovers the encrypted target ID. In step 220 the administrator device 106 generates and sends intercept provisioning message 222 including the encrypted target ID and time information indicating when the intercept is to be performed, e.g., an expiration date. In step 224 the network communications device 104 receives message 222 and recovers the communicated information. In step 226 the network communications device 104 stores the received encrypted target identifier (ciphertext communicating the target ID) in operating system administrator accessible storage device 112. In step 228 the network communications device 104 stores the received time information, e.g., expiration date, for performing interception of the target, in operating system administrator accessible storage device 112, along with the encrypted target ID. In step 230 the network communications device 104 generates and sends provisioning acknowledgment message 232 to administrator device 106 acknowledging receipt of the intercept provisioning message 222.

In step 236 the network communications device 104 loads the stored encrypted target identifier (ciphertext communicating the target ID) of provisioning message 222, from storage device 112 into active message 114. In step 242 the intercept application generates and sends a decryption request message 244 to security device 108, said decryption request message including the encrypted target identifier (ciphertext communicating the target ID). In step 246 the security device 108 receives the decryption request 244 and recovers the communicated information. In step 248 the security device 108 checks if the received decryption request 244 is a valid request, e.g., checks if the decryption request came from a network communications device which was recently provisioned to perform an intercept and is an expected decryption request. In this example, the security device 108 determines that the decryption request is a valid request and in response, in step 250 generates and sends response message 252 conveying an unencrypted target ID in plain text to the intercept application of the network communications device 104. In step 252 the intercept application receives the response message 252 and recovers the target information, e.g. unencrypted target identifier. In step 256 the intercept application stores the unencrypted target identifier in active memory 114, e.g. in a list of unencrypted target identifiers for which interception is to be performed by the network communication device 104.

In step 258 the intercept application of network communication device 104 starts monitoring for the target, e.g. monitoring communications for the identifier corresponding to target device UE 1 118. In steps 260 and steps 262, UE 1 118 and UE 2 120 establish a communications session and start transmitting communications data and information 264 over a communications path including network communications device 104, which is monitoring for communications corresponding to UE 1 118, which is an intercept target. In step 266 the intercept application on network communications device 104 detects the identifier corresponding to target UE 1 118 and performs an interception. In step 268 the intercept application in network communications device 104 stores interception data/information in active memory 114. In step 270 the intercept application of network communications device 104 generates and sends a copy of the intercepted communications 272 to administrator device 106. In step 274 the administrator device 106 receives the copy of intercepted communications 272, and in step 275 the administrator device 106 stores the received intercepted communications. In step 276 the law enforcement node 116 generates and sends a request for content message 277 to the administrator device 106 requesting intercepted content corresponding to UE 1 118 target. In step 278 the administrator device 106 receives the request for content 277, and in response, in step 270 the administrator device 106 generates and sends content 280 corresponding to the interception of communications 264 to law enforcement node 116. In step 281 law enforcement node 116 receives and recovers content 280, which includes the copy of the intercepted communications corresponding to target UE 1 118.

In step 282 UE 3 122, e.g., a malignant node, generates and sends a decryption request 284 to security device 108. Decryption request 284 is an unauthorized decryption request, as UE 3 122 has not been previously selected to be provisioned and has not been previously provisioned with an intercept provisioning message. In step 286 security device 108 receives decryption request 284. In step 288 security device 108 checks the received decryption request message 284 and determines that the request is an unauthorized request, e.g., based on UE 3 122 not being on a list of devices which have been provisioned to perform intercepts at the current time. In response to the determination that the request is unauthorized, in step 290, security device 108 triggers an alarm. In step 292, in response to the triggered alarm condition, the security device 108 generates and transmits an alarm message 294 to the administrator device, e.g., indicating that a suspected unauthorized decryption request message has been received from UE 3 122 and further including a copy of the received suspected unauthorized decryption request message. In step 296 the administrator device receives the alarm message 294 and forwards the alarm message or information communicated in the alarm message to the law enforcement node 116 as alarm message 298. In step 300 the law enforcement node 116 receives the alarm message 298, recovers the communicated information and takes a corrective action, e.g., identifies UE 3 as a potential target for a future communications intercept, directs law enforcement to investigate the user of UE 3 122, and/or contacts the law enforcement investigation corresponding to the intercept target in the unauthorized decryption request of the receipt of an unauthorized request.

Box 302 indicates that the operating system administrator accessible storage device 112 includes a list of encrypted target identifier(s) and corresponding time information, e.g., information indicating a time interval or time duration when an authorized communications intercept of a particular target is to performed and/or information indicating when an authorized communications intercept of a particular target is to expire. Box 304 indicates that the active memory 114, e.g., a volatile memory which is not accessible by the operating system of network communication device 104, includes a list of unencrypted target identifier(s) corresponding to the list of encrypted target identifier(s) stored in storage device 112. In step 306, network communications device 104 experiences power loss, and as a result of the power loss in step 308, the list of unencrypted target(s) stored in active memory is lost. In step 310 the operating system of the network communications device is operated to reset the network communications device 104. In step 312, as part of the reset, the encrypted target list stored in non-volatile memory in storage device 112 is retrieved and in step 316 the encrypted target list is loaded into the active memory 114. In step 318 the intercept application, running on the network communications device, generates and sends a decryption request message 320 to security device 108. The decryption request message 320 includes a list of one or more unencrypted targets, e.g., an encrypted target identifier corresponding to each of targets. In some embodiments, the decryption request further includes an indicator indicating that the decryption request is due to a device reset. In step 322 the security device 108 receives the decryption request message 320. In step 324, the security device 108 checks the request and determines that the request is a valid request, e.g., the decryption request is from an authorized device and has been sent in response to device reset. In step 326 the security device 108 decrypts the received list of one or more encrypted target identifiers and sends the unencrypted target identifier(s) (plain text target identifier(s)) 328 to the intercept application of network communications device 104. In step 330 the intercept application of network communications device 104 receives the list of unencrypted target identifiers. In step 332 the intercept application stores the received list of unencrypted target identifiers in active memory 114, and thus in step 332 the list unencrypted targets 304 has been restored to active memory 114.

Periodically, for each of the intercept targets, the intercept application, in step 334 generates and sends an expiration check message 336 to the operating system of the network communications device 104. In step 338, the operating system of the network communication device 104 receives an expiration check for a target, and checks if the target as to whether or not the target should still be monitored. In this example, in step 340 the operating system determines that the monitoring interval for the target has expired and sends an expiration indication message 342 to the intercept application. In step 346 the intercept application receives the expiration indication message 342, deactivates the monitoring of the target and deletes the unencrypted target ID from its list of unencrypted target IDs to be monitored in active memory 114. In step 348 the intercept application generates and sends intercept deactivation message 350 to the operating system of network communication device 104. In step 352 the operating system receives intercept deactivation message 350 and deletes the encrypted target and corresponding time entry from storage device 112 corresponding to the target which is being deactivated. In step 354 the network communications device 104 generates and sends a deactivation confirmation message 356 to administrator device 106. In step 358 the administrator device 106 receives the deactivation confirmation message 356 and records, e.g., in a log, that the monitoring of the target is no longer being performed by the network communications device 104.

In one example, a target identifier in plain text=123456789; and the corresponding ciphertext, which is an encrypted representation of the target=iqw23814951243.

Figure 3:
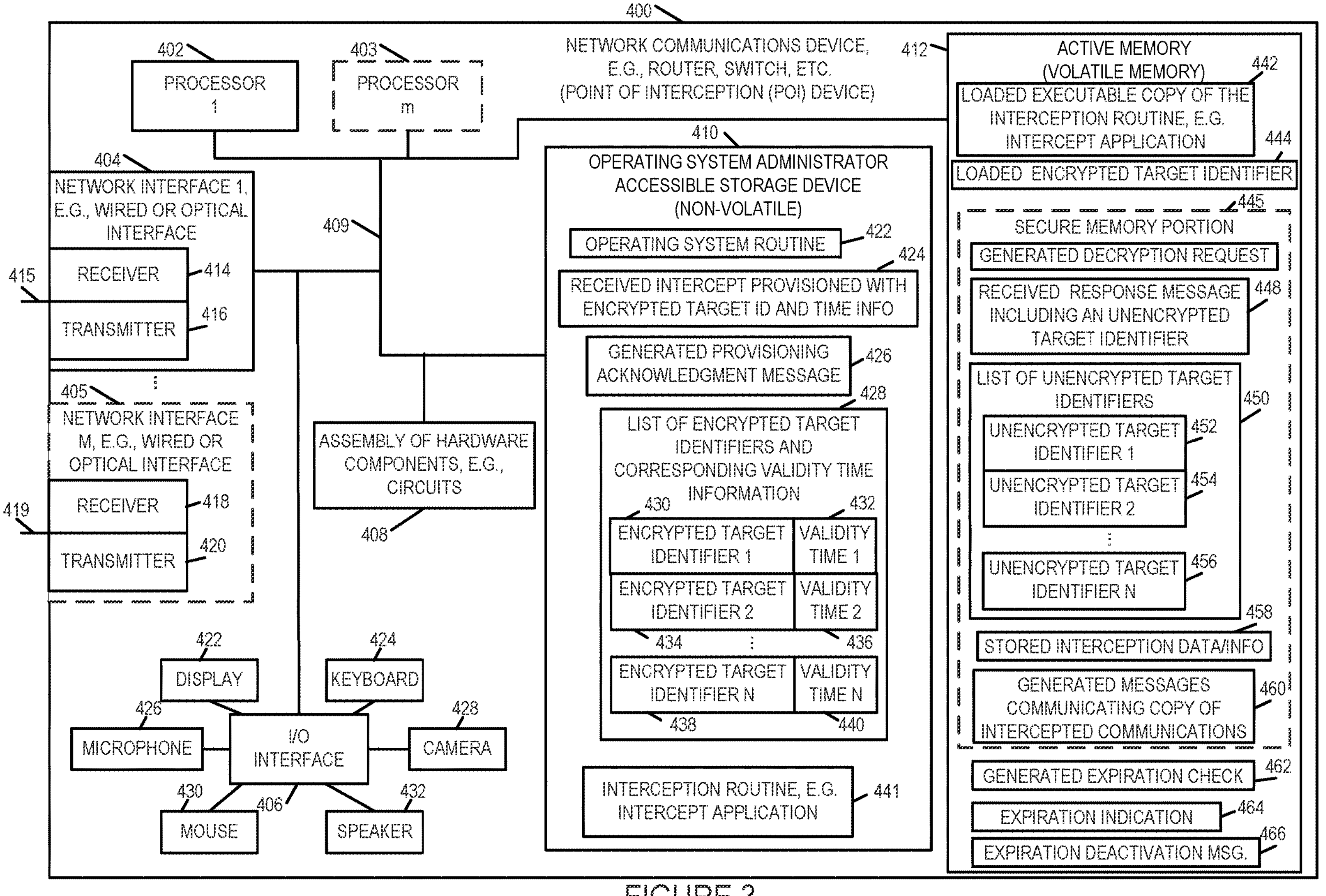
FIG. 3 is a drawing of an exemplary network communications device, e.g., a point of interception (POI) device, in accordance with an exemplary embodiment.

FIG. 3 is a drawing of an exemplary network communications device 400 in accordance with an exemplary embodiment. Network communications device 400 is, e.g., network communications device 104 of FIG. 2. Network communications device 400 includes one or more processors (processor 1 402, e.g., CPU 1, . . . , processor m 403, e.g., CPU m), one or more network interfaces (network interface 1 404, . . . , network interface M 405), an I/O interface 406, an assembly of hardware components 408, e.g., an assembly of circuits, an operating system administrator accessible storage device 410, and an active memory 412 coupled together via a bus 409 over which the various elements may interchange data and information.

Network communications device 400 further includes a plurality of I/O devices (display 422, e.g., a touchscreen display, keyboard 424*m* microphone 426, camera 438, mouse 430 and speaker 432) coupled to I/O interface 406 via which the various I/O devices are coupled to bus 409 and to other elements of network communications device 400.

Network interface 1 404, e.g., a wired or optical interface, includes receiver 414 and transmitter 416 coupled to interface connector 415. Optional network interface M 405, e.g., a wired or optical interface, includes receiver 418 and transmitter 420 coupled to interface connector 419. Each of the network interfaces 404, 405 may, and sometimes does include a plurality of ports.

Operating system administrator accessible storage device 410, e.g., a non-volatile memory, includes operating system routine 422, a received intercept 424 provisioned with an encrypted target ID and time info, e.g., expiration information, from an administrator device of a control system and a generated provisioning acknowledgment message 426 to be sent to an administrator device of a control system. Storage device 410 further includes a list 428 of encrypted target identifiers and corresponding validity time information ((encrypted target identifier 1 430, validity time 1 432), (encrypted target identifier 2 434, validity time 2 436), . . . , (encrypted target identifier N 438, validity time N 440). In some embodiments, storage device 410 further includes an interception routine 441, e.g., an interception application, which can be, and sometimes is downloaded into active memory 412 for execution, e.g., as part of initialization or as part of a reset operation. In some other embodiments, the interception routine 441 is stored on an additional non-volatile memory included within network communications device 400.

Active memory 412, e.g. a volatile memory, includes a loaded copy 442 of the interception routine 441, e.g., the interception app, a loaded encryption target identifier 444, a generated decryption request 446 including an encrypted target identifier to be sent to a security device, a received response message 448 from the security device, said received response message 448 including an unencrypted target identifier, and a list of unencrypted target identifiers 450 being maintained corresponding to active interception targets (unencrypted target identifier 1 452, unencrypted target identifier 2 454, . . . , unencrypted target identifier N 456). Active memory 412 further includes stored interception data/information 458, generated messages communicating a copy of intercepted communications 462, a generated expiration check message 462, a received expiration indication message 464, and an expiration deactivation message 466. In various embodiments at least memory portion 445 (including memory elements 446, 448, 450, 458, 460) of active memory 412 is not accessible by the operating system of device 400 of by an administrator of the operating system of device 400. Thus, information including unencrypted target identifiers and intercepted communications are protected and stored in a secure area of active memory and cannot be accessed by the operating system or the administrator of device 400.

Figure 4:
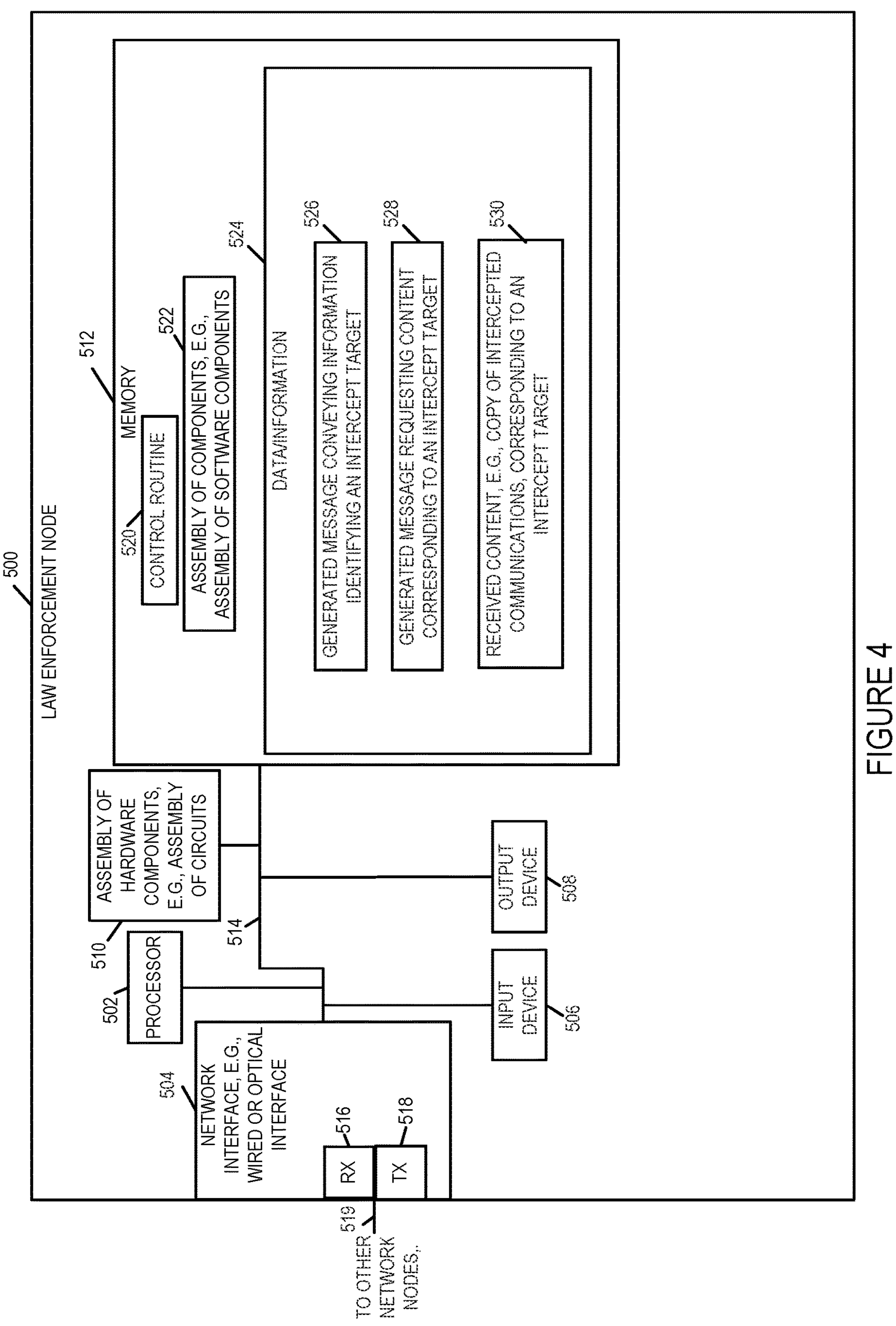
FIG. 4 is a drawing of an exemplary law enforcement node in accordance with an exemplary embodiment.

FIG. 4 is a drawing of an exemplary law enforcement node 500 in accordance with an exemplary embodiment. Law enforcement node 500 is, e.g., law enforcement node 116 of FIG. 2. Exemplary law enforcement node 500 includes a processor 502, e.g., a CPU, a network interface 504, e.g., a wired or optical interface, an input device 506, e.g., a keyboard, an output device 508, e.g., a display, an assembly of hardware components 510, e.g., an assembly of circuits, and memory 512 coupled together via a bus 514 over which the various elements may interchange data and information. Network interface 504 includes a receiver 516 and a transmitter 518 coupled to connector 519 which coupled the law enforcement node to other network nodes, e.g., an administrator node of a control system. Memory 512 includes a control routine 520, an assembly of components 522, e.g., an assembly of software components, and data/information 524. Data/information 524 includes a generated message 526 conveying information identifying an intercept target, e.g., name/address, phone number, e-mail address, user identifier, device identifier, etc., corresponding to an intercept target, a generated message 528 requesting content corresponding to an intercept target, and received content 530, e.g., a copy of intercepted communications, corresponding to an intercept target and corresponding metadata.

Figure 5:
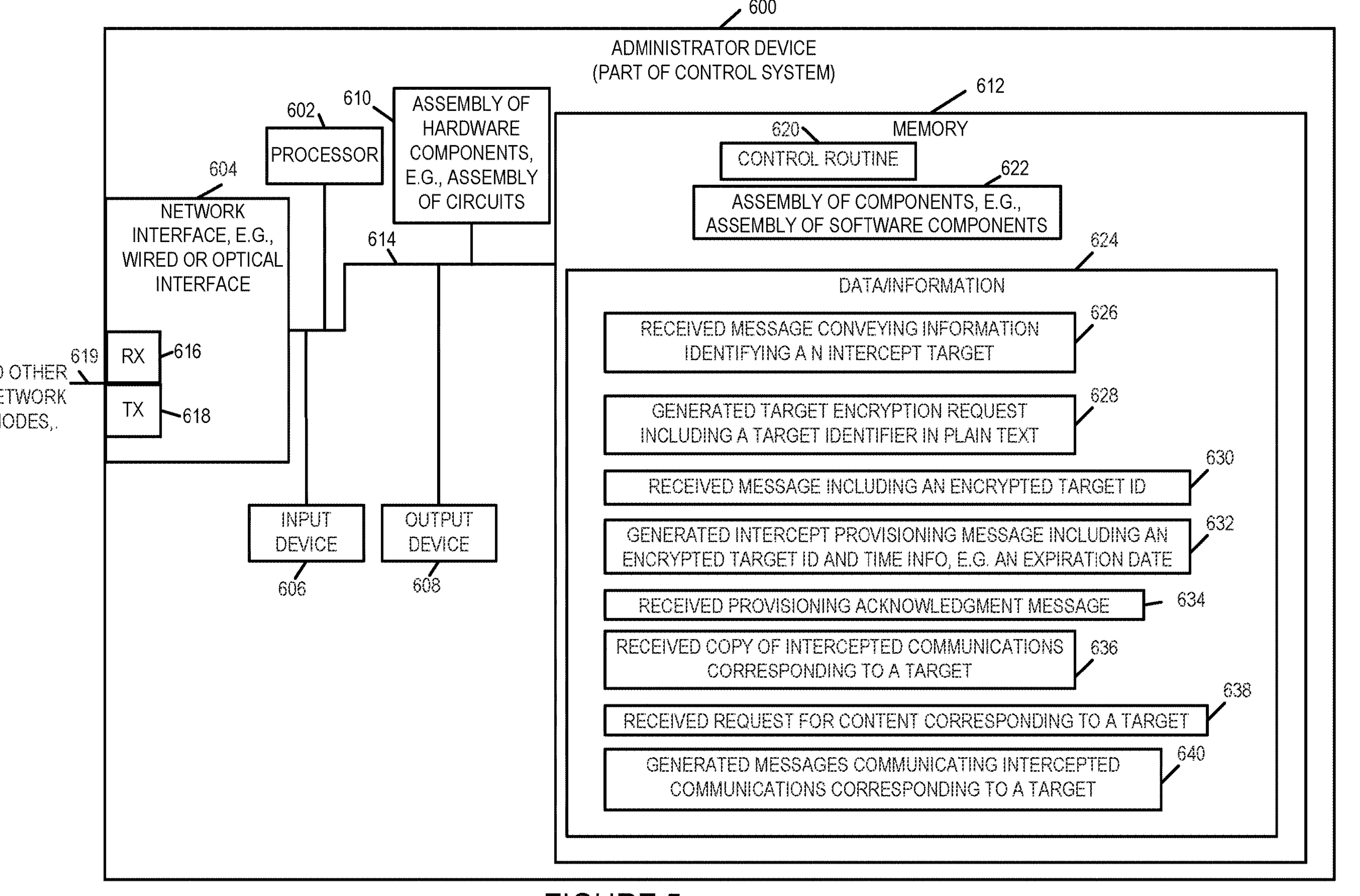
FIG. 5 is a drawing of an exemplary administrator device in accordance with an exemplary embodiment.

FIG. 5 is a drawing of an exemplary administrator node 600 in accordance with an exemplary embodiment. Administrator node 600 is, e.g., administrator node 106 of control system 102 FIG. 2. Exemplary administrator node 600 includes a processor 602, e.g., a CPU, a network interface 604, e.g., a wired or optical interface, an input device 606, e.g., a keyboard, an output device 608, e.g., a display, an assembly of hardware components 610, e.g., an assembly of circuits, and memory 612 coupled together via a bus 614 over which the various elements may interchange data and information. Network interface 604 includes a receiver 616 and a transmitter 618 coupled to connector 619 which coupled the administrator node 600 to other network nodes, e.g., a law enforcement node, a security device and a network communications device. Memory 612 includes a control routine 620, an assembly of components 622, e.g., an assembly of software components, and data/information 624. Data/information 624 includes a received message 626 from a law enforcement node conveying information identifying an intercept target, a generated target encryption request 628 including a target identifier in plain text, which is to be sent to a security device, e.g., a LISE, a received message 630 including an encrypted target ID, which was sent from the security device in response to target encryption request, a generated intercept provisioning message 632 including an encrypted target ID and corresponding time information, e.g. an expiration date, which is to be sent to one or more selected network communications devices, which are to perform interception of the target's communications, a received provisioning acknowledgement message 634, a received copy of intercepted communications corresponding to a target 636 from a network communications device, a received request for content corresponding to a target 638 from a law enforcement node and generated messages 640 communicating intercepted communications and metadata corresponding to a target to be sent to the law enforcement node.

Figure 6:
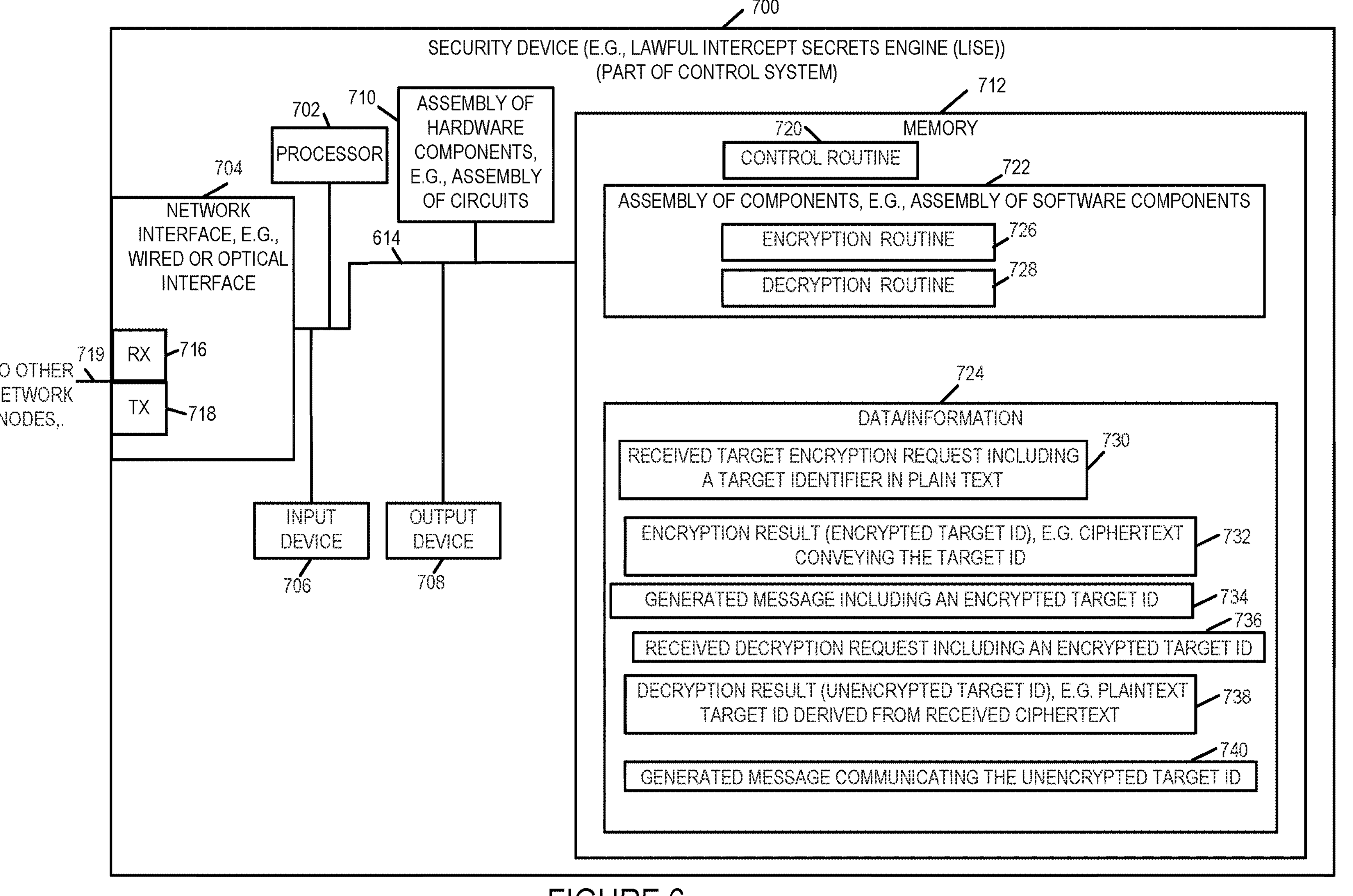
FIG. 6 is a drawing of an exemplary security device, e.g., a lawful intercept secrets engine (LISE), in accordance with an exemplary embodiment.

FIG. 6 is a drawing of an exemplary security device 700 in accordance with an exemplary embodiment. In some embodiments, security device 700 is or includes a Lawful Intercept Secrets Engine. Security device 700 is, e.g., security device 108 of control system 102 FIG. 2. Exemplary security device 700 includes a processor 702, e.g., a CPU, a network interface 704, e.g., a wired or optical interface, an input device 706, e.g., a keyboard, an output device 708, e.g., a display, an assembly of hardware components 710, e.g., an assembly of circuits and a memory 712 coupled together via a bus 714 over which the various elements may interchange data and information. Network interface 704 includes a receiver 716 and a transmitter 718 coupled to connector 719 which couples the security device 700 to other network nodes, e.g., an administrator device and a network communications device. Memory 712 includes a control routine 720, an assembly of components 722, e.g., an assembly of software components, and data/information 724. Assembly of components 722 includes an encryption routine 726 which encrypts target identifiers, e.g., encrypts a plain text target identifier into cipher text, and a decryption routine 728 which decrypts an encrypt target identifier (e.g., a ciphertext) to recover an unencrypted (plain text) target identifier. Data/information 724 includes a received target encryption request including a target identifier in plain text 730, an encryption result (encrypted target ID) 732, e.g., a ciphertext conveying the target ID, which is an output of encryption routine 726, a received decryption request including an encrypted target ID 736, a decryption result (unencrypted target ID) 738, e.g. a plain text target ID derived from a received ciphertext by decryption routine 728, an a generated message communicating the unencrypted target ID 740.

Figure 7:
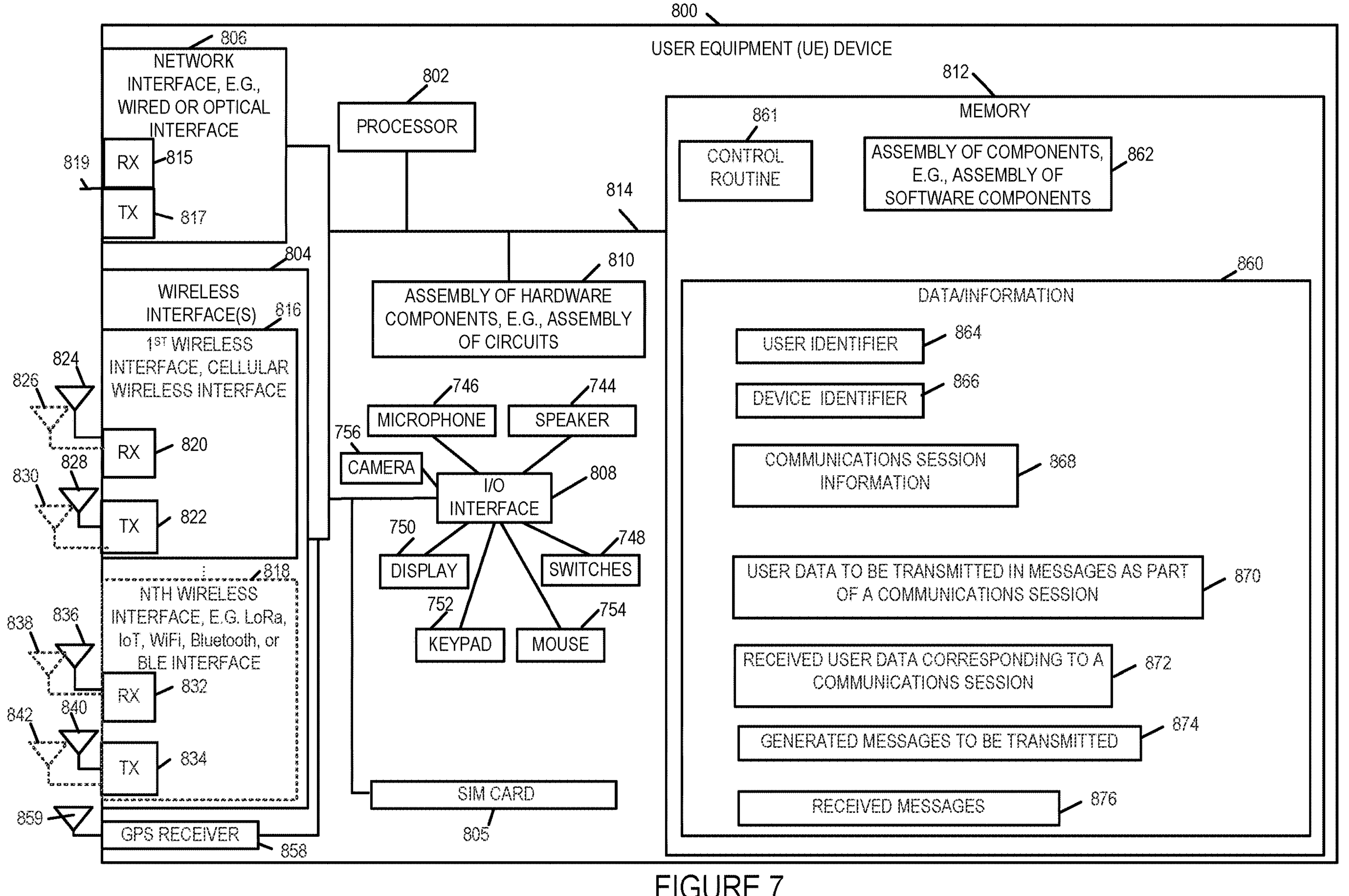
FIG. 7 is a drawing of an exemplary user equipment (UE) device in accordance with an exemplary embodiment.

FIG. 7 is a drawing of an exemplary user equipment (UE) device 800 in accordance with an exemplary embodiment. UE device 800 is, e.g., any of the UE 1 118, UE 2 120, or UE 3 122 of FIG. 2. Exemplary UE device 800 includes a processor 802, e.g., a CPU, wireless interface(s) 804, a network interface 806, e.g., a wired or optical interface, an input/output (I/O) interface 808, an assembly of hardware components 810, e.g., an assembly of circuits, memory 812, a GPS receiver 858 and a subscriber identity module (SIM) card 805 coupled together via a bus 814 over which the various elements may interchange data and information.

Wireless interface(s) 804 includes one or more wireless interfaces (1st wireless interface 816, e.g., a cellular wireless interface, . . . , Nth wireless interface 810, e.g., a Long Range (LoRa), Internet of Things (IoT), WiFi, Bluetooth, or Bluetooth Low Energy (BLE) interface. 1st wireless interface 816 includes a wireless receiver 820 coupled to one or more receive antennas (824, . . . , 826) and a wireless transmitter 822 coupled to one or more transmit antennas (828, . . . , 830). Nth wireless interface 818 includes a wireless receiver 822 coupled to one or more receive antennas (836, . . . , 838) and a wireless transmitter 834 coupled to one or more transmit antennas (840, . . . , 842).

Network interface 806 includes a receiver 815 and a transmitter 87 coupled to connector 819 which may, and sometimes does couple the UE device 800 of network nodes, e.g., when the UE is stationary and at a location in which a fixed wired or optical connector is available.

Memory 812 includes a control routine 861, an assembly of components 862, e.g., an assembly of software components, and data/information 860. Data/information 860 includes a user identifier 864, a device identifier 866, communications session information 868, user data to be transmitted in messages as part of a communications session, 870, received user data corresponding to a communications session 872, generated messages to be transmitted 874 and received messages 876. Various generated and received messages, packets, and/pr packet portions, include user ID and/or device ID information, e.g., in headers.

UE device 800 further includes a plurality of I/O devices (microphone 846, speaker 844, camera 856, display 850, switches 848, keypad 852 and mouse 854), coupled to I/O interface 808 via which the various I/O devices are coupled to bus 814 and to other elements within UE device 800.

Figure 8A:
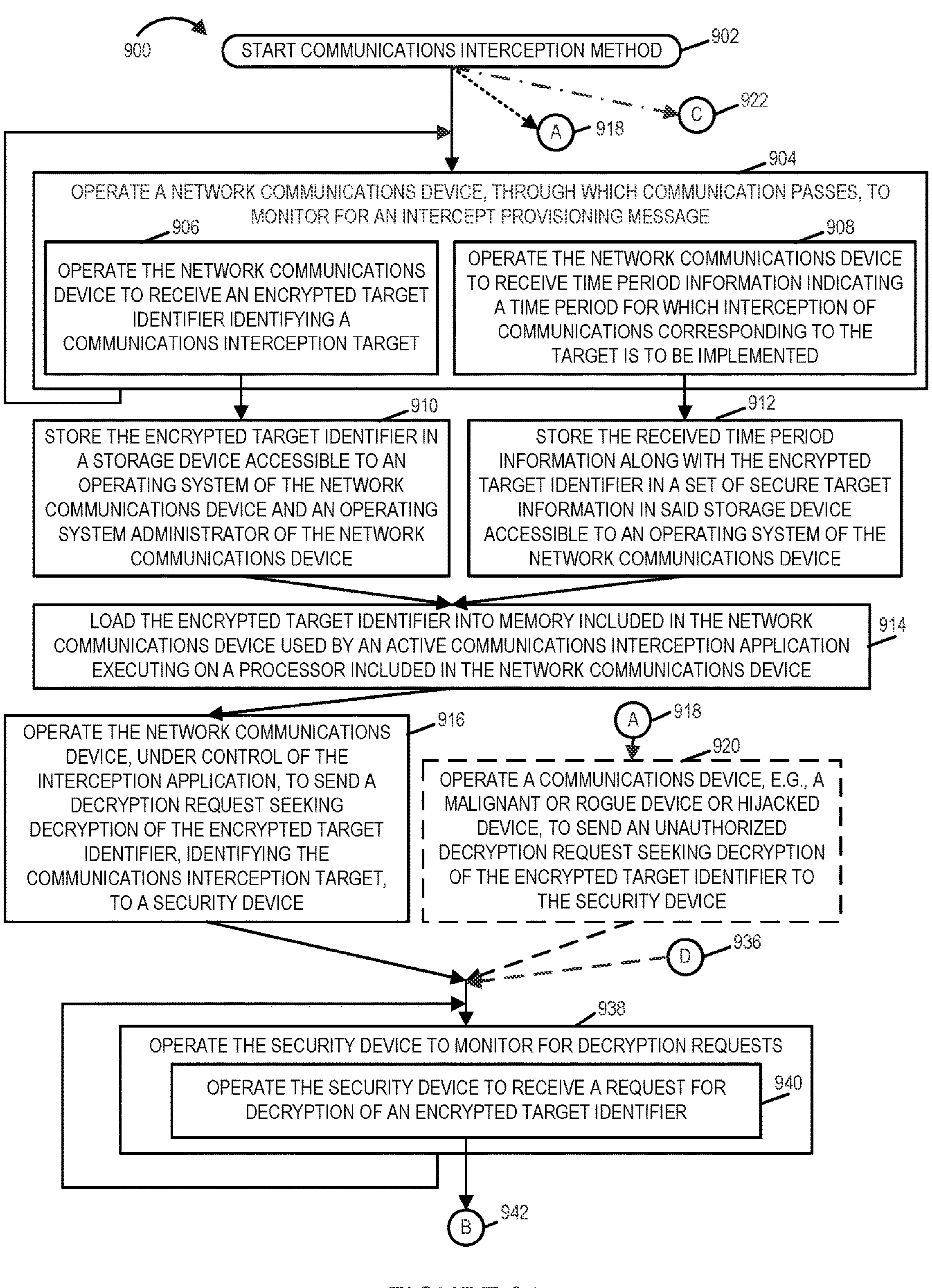
FIG. 8A is a first part of a flowchart of an exemplary communications interception method in accordance with an exemplary embodiment.
Figure 8B:
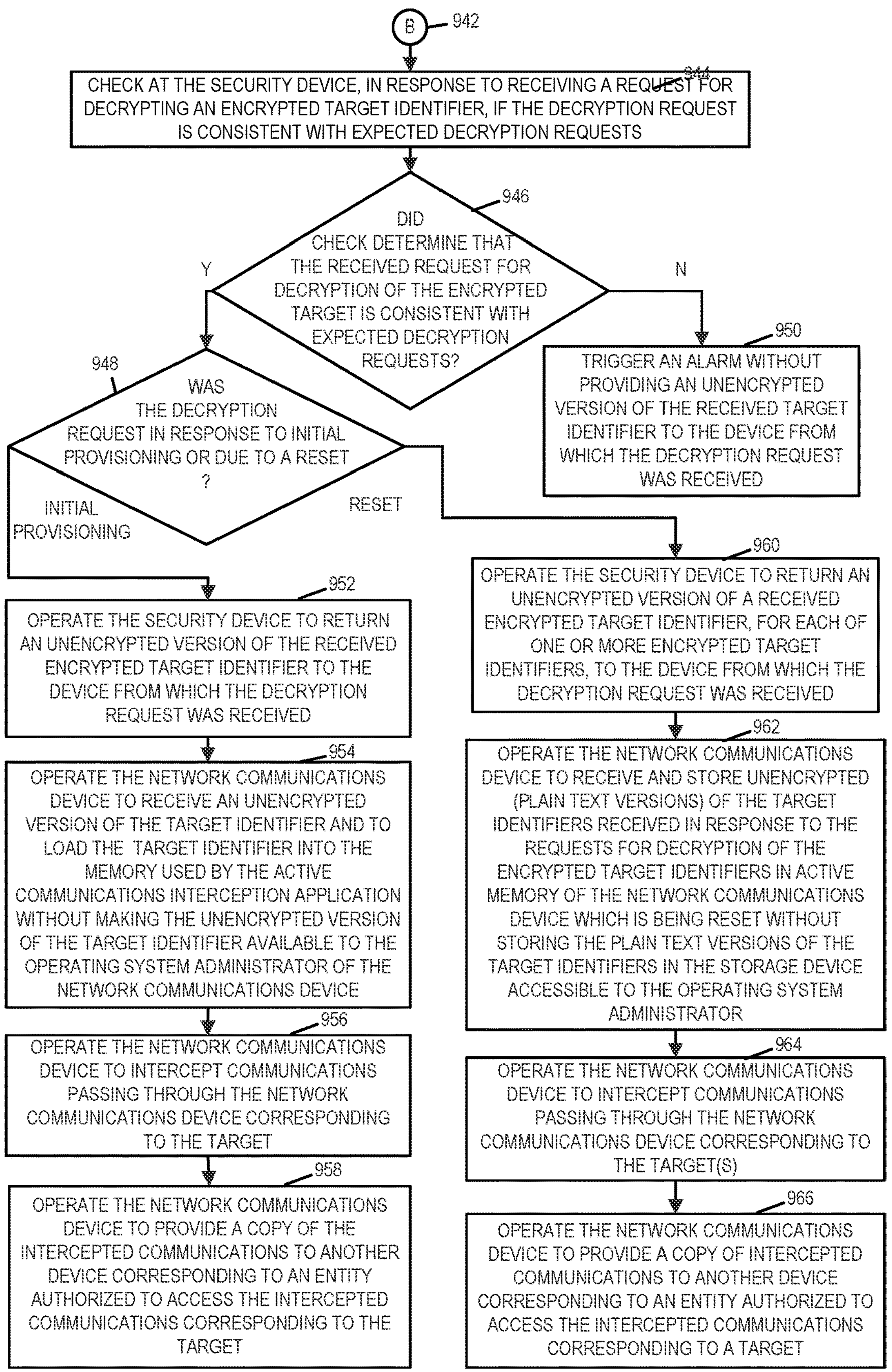
FIG. 8B is a second part of a flowchart of an exemplary communications interception method in accordance with an exemplary embodiment.
Figures 8, 8C:
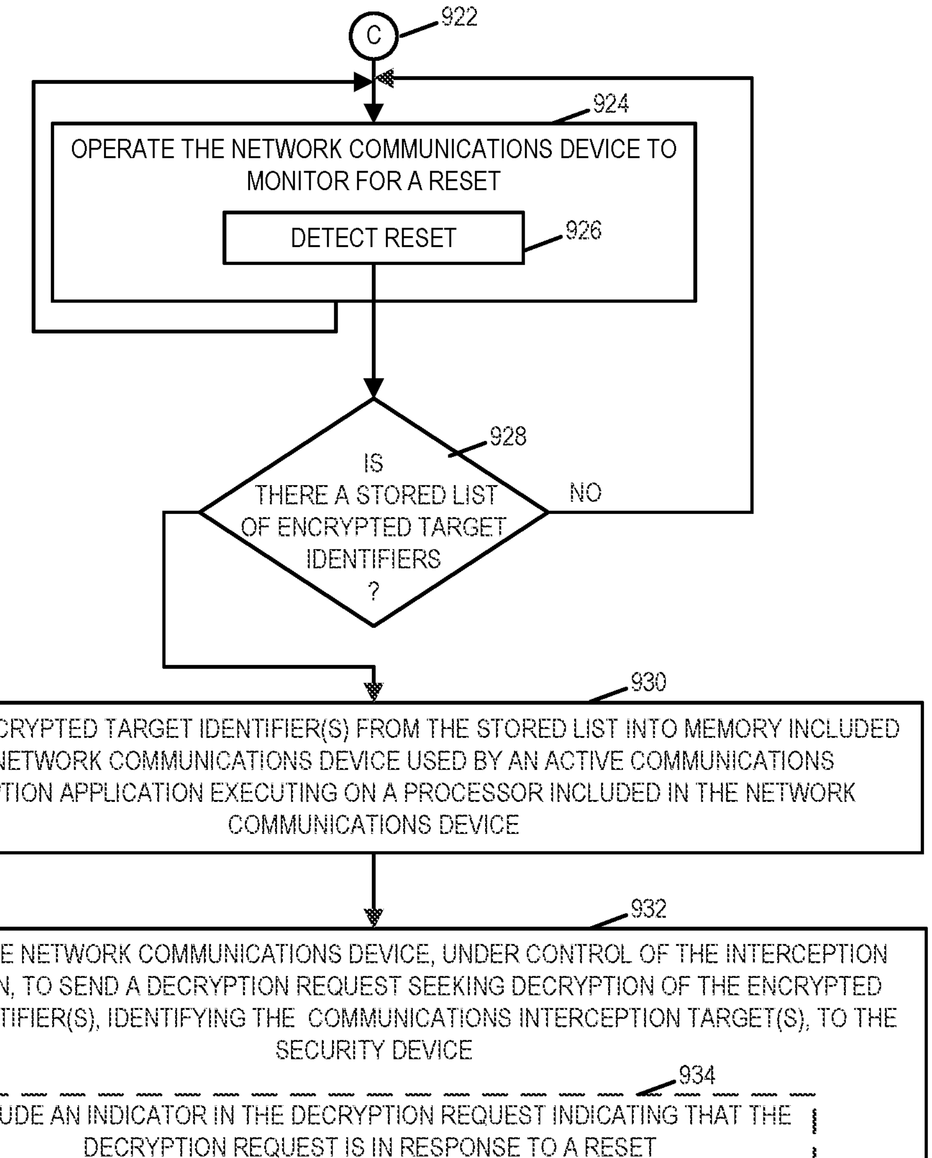
FIG. 8C is a third part of a flowchart of an exemplary communications interception method in accordance with an exemplary embodiment.
FIG. 8 comprises the combination of FIG. 8A, FIG. 8B and FIG. 8C.

FIG. 8, comprising the combination of FIG. 8A, FIG. 8B and FIG. 8C, is a flowchart 900 of an exemplary communications interception method in an accordance with an exemplary embodiment. Operation of the exemplary method starts in step 902 in which the communications system is powered on and initialized. Operation proceeds from start step 902 to step 904. Operation may, and sometimes does, also proceed from step 902, via connecting node A 918 to step 920. In addition, operation may, and sometimes does, also proceed from step 902, via connecting node C 922 to step 924.

Returning to step 904, in step 904 a network communications device, e.g., device 104, through which communication passes, is operated to monitor for an intercept provisioning message. Step 904 is performed repetitively, on an ongoing basis. Step 906 may, and sometimes does includes steps 906 and 908. In step 906 the network communications device receives an encrypted target identifier, e.g., an encrypted first target identifier, identifying a communications interception target, e.g., a first communications interception target, e.g., UE 1 118. In some embodiments, the encrypted target identifier, e.g., an encrypted first target identifier, is a cipher text version of a plain text identifier identifying the interception target, e.g., the first interception target. In step 908 the network communications device receives, e.g., along with the encrypted target identifier, time period information, e.g., validity duration or time interval duration, indicating a time period for which interception of the communications corresponding to the target is to be implemented. Operation proceeds from steps 906, 908 to steps 910, 912 respectively. In step 910 the network communications device stores the received encrypted target identifier, e.g., the received first encrypted target identifier, in a storage device accessible to an operating system administrator of the network communications device. In step 912 the network communications device stores the received time period information along with the encrypted target identifier in a set of secure target information in said storage device accessible to an operating system of the network communications device. Operation proceeds from steps 910 and 912 to step 914.

In step 914 the network communications device loads the encrypted target identifier, e.g., the encrypted first target identifier, into memory, e.g., random access memory (RAM), included in the network communications device used by an active communications interception application executing on a processor included in the network communications device. Operation proceeds from step 914 to step 916. In step 916 the network communications device, under control of the interception application, sends a decryption request seeking decryption of the encrypted target identifier, identifying the communications interception target, (e.g., a decryption request seeking decryption of the encrypted first target identifier, identifying the first communications interception target) to a security device, e.g., a Lawful Intercept Secrets Engine (LISE). In some embodiments the security device is security device 108 including LISE 110. Operation proceeds from step 916 to step 938.

Returning to optional step 920, in step 920, a communications device, e.g., a malignant or rogue device or a hijacked device, e.g., UE 3 122, sends an unauthorized decryption request of an encrypted target identifier, e.g., an illegally obtained encrypted target identifier, to the security device. Operation proceeds from step 920 to step 938.

Returning to step 924 (see FIG. 8C), in step 924 the network communications device is operated to monitor for a reset. Step 924 is performed repetitively on an ongoing basis. Step 924 may, and sometimes does include step 926, in which the network communications device detects a network communications device reset, e.g., due to a temporary power loss, due to an error or fault detected at the network communications, due to maintenance operations, or due to load balancing related operations. Operation proceeds from step 926 to step 928. In step 928 the network communications device determines if there is a stored list of encrypted target identifiers. If there is not a stored list of encrypted target identifiers, e.g., the network communications device was not targeting any communications devices for communications interception prior to the reset, then operation proceeds from step 928 to the input of step 924.

However, if the network communications device includes a stored list of encrypted target identifiers, e.g., the network communications device was targeting one or more communications devices for communications interception prior to the reset, then operation proceeds from step 928 to step 930. In step 930 the network communications device loads the encrypted target identifier(s) from the stored list into memory included in the network communications device used by an active communications interception application executing on a processor included in the network communications device. Operation proceeds from step 930 to step 932.

In step 932 the network communications device, under control of the interception application, sends a decryption request seeking decryption of the encrypted target identifier(s), identifying the communications interception target(s), to the security device. In some embodiments, step 932 includes step 934 in which the network communications device includes an indicator in the decryption request indicating that the decryption request is in response to a reset. Operation proceeds from step 932, via connecting node D 936, to step 938 (See FIG. 8A).

In step 938, the security device is operated to monitor for decryption requests. Step 928 is performed repetitively, on an ongoing basis. Step 938 may, and sometimes does, include step 940, in which the security device receives a request for decryption of an unencrypted target identifier. Operation proceeds from step 940, via connecting node B 942 to step 944 (See FIG. 8B). In step 944 the security device checks, in response to receiving a request for decryption of an encrypted target identifier, if the decryption request is consistent with expected decryption requests. For example, in step 944 the security device checks if the received decryption request is from a device which was sent an encrypted target identifier and is within the period of time for which the target is to be monitored and/or checks if the request is part of a set of decryption request corresponding to a network communications device reset. In some embodiments, a decryption request corresponding to a reset includes an indicator indicating that the request is in response to a reset of the network communications device.

Operation proceeds from step 944 to step 946. If the check of step 944 determines that that the received request for decryption of an encrypted target is not consistent with expected decryption requests, then operation proceeds from step 946 to step 950, in which the security device triggers an alarm without providing an unencrypted version of the received target identifier to the device from which the decryption request was received.

However, if the check of step 944 determines that the received request for decryption is consistent with expected decryption requests, then operation proceeds from step 946 to step 948.

In step 948 the security device determines if the decryption request is in response to an initial provisioning message or is due to a reset. If the decryption request is in response to an initial provisioning of an encrypted target identifier, then operation proceeds from step 948 to step 952. However, if the decryption request is in response to a reset of the network communications device, (e.g., in which unencrypted target identifiers stored in active memory used by the intercept application, e.g., RAM), have been lost, then operation proceeds from step 948 to step 960.

Returning to step 952, in step 952, the security device is operated to return an unencrypted version of the received encrypted target identifier (plain text version of the target identifier), e.g., unencrypted version of the first target identifier, to the device from which the decryption request, e.g., network communications device 104, was received. Operation proceeds from step 952 to step 954. In step 954 the network communications device receives an unencrypted version of the target identifier, e.g., unencrypted version of the first target identifier, and loads the target identifier, e.g., the unencrypted first target identifier, into the memory used by the active communications interception application without making the unencrypted version of the target identifier, e.g., unencrypted version of the first target identifier, available to the operating system administrator of the network communications device. Operation proceeds from step 954 to step 956.

In step 956 the network communications device is operated to intercept, e.g., duplicate, communications passing through the network communications device corresponding to the target, e.g., the first target. Operation proceeds from step 956 to step 958. In step 958 the network communications device is operated to provide a copy of the intercepted communications to another device, e.g., law enforcement node 116, corresponding to an entity (e.g., administrative device 106 or law enforcement device 116) authorized to access the intercepted communications corresponding to the target, e.g., the first target.

Returning to step 960, in step 960, the security device is operated to return an unencrypted version of a received encrypted target identifier, for each of one or more unencrypted target identifiers, to the device from which the decryption request was received. Operation proceeds from step 960 to step 962. In step 962 the network communications device receives and stores unencrypted (plain text versions) of the target identifiers, received in response to the request for decryption of the encrypted target identifier(s), in active memory of the network communications device, which is being reset, without storing the plain text versions of the target identifiers in the storage device, accessible to the operating system administrator of the network communications device. Thus, in step 962 the lost set of unencrypted target identifiers is restored to secure active memory (e.g., secure RAM memory) in the network communications which is used by an active communications interception application but is not accessible by the operating system administrator. Operation proceeds from step 962 to step 964.

In step 964 the network communications device is operated to intercept communications passing through the network communications device corresponding to one or more targets. Operation proceeds from step 964 to step 966. In step 966 the network communications device is operated to provide a copy of the intercepted communications to another device corresponding to an entity authorized to access the intercepted communications corresponding to the target.

Figure 9A:
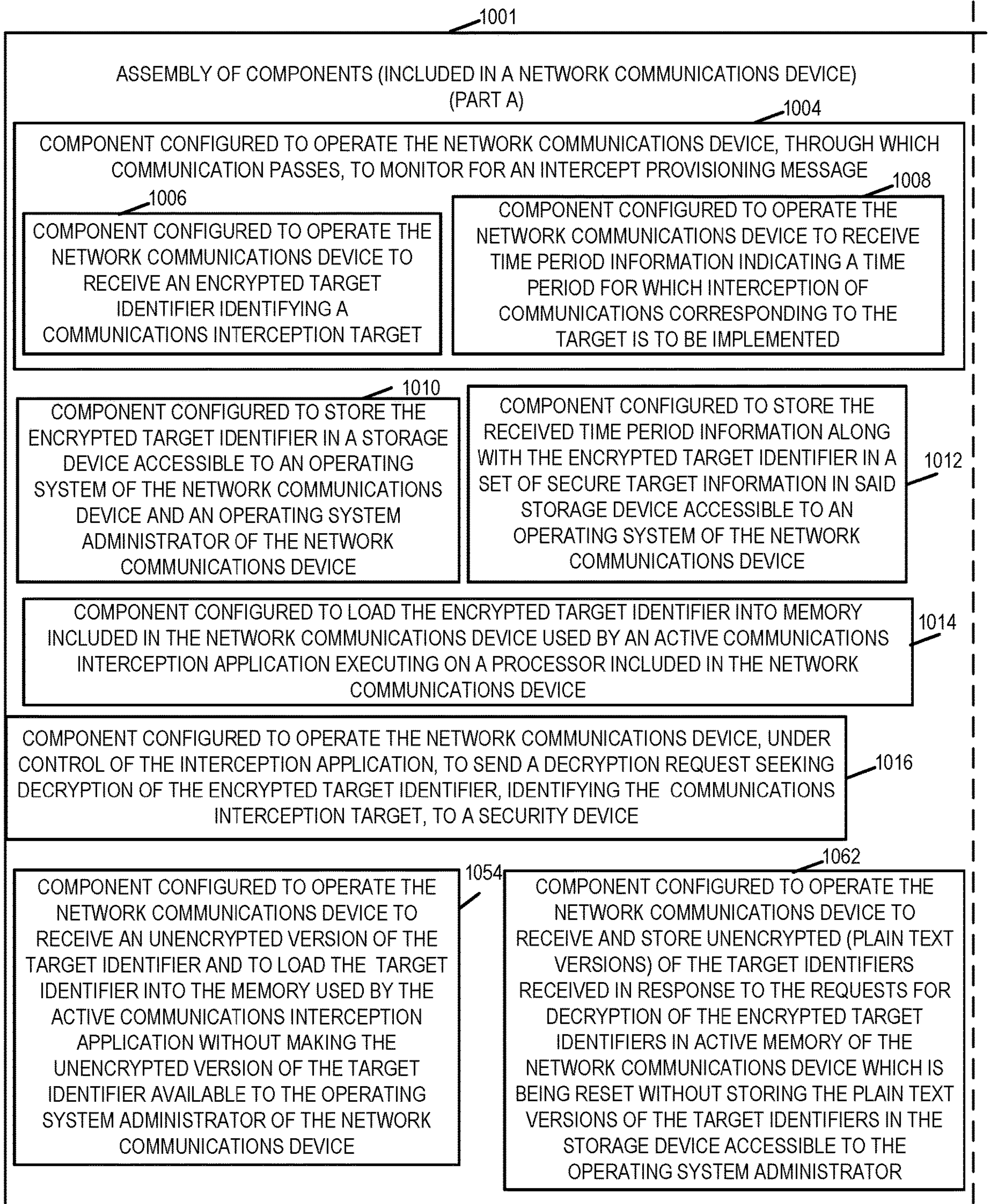
FIG. 9A is a first part of a drawing of an exemplary assembly of components which may be included in an exemplary network communications device in accordance with an exemplary embodiment.

FIG. 9 comprising the combination of FIG. 9A and FIG. 9B, is a drawing of an assembly of components 1000, comprising Part A 1001 and Part B 1003, which may be included in an exemplary network communications device, e.g., network communications device 1004 of FIGS. 1 and 2, network communications devices 1005, 1007 of FIG. 1, network communications device 400 of FIG. 3 and/or a network communications device implementing a method in accordance with flowchart 900 of FIG. 8, in accordance with an exemplary embodiment.

The components in the assembly of components 1000 can, and in some embodiments are, implemented fully in hardware within a processor, e.g., processor 402, e.g., as individual circuits. The components in the assembly of components 1000 can, and in some embodiments are, implemented fully in hardware within the assembly of hardware components 408, e.g., as individual circuits corresponding to the different components. In other embodiments some of the components are implemented, e.g., as circuits, within processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the communications device 400, with the components controlling operation of communications device 400 to implement the functions corresponding to the components when the components are executed by a processor e.g., processor 402. In some such embodiments, the assembly of components 1000 is included in the memory 410 as part of an assembly of software components. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 402, configure the processor to implement the function corresponding to the component. In embodiments where the assembly of components 1000 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the communications device 400 or elements therein such as the processor 402, to perform the functions of corresponding steps illustrated and/or described in the method of one or more of the flowcharts, signaling diagrams and/or described with respect to any of the Figures. Thus, the assembly of components 1000 includes various components that perform functions of corresponding one or more described and/or illustrated steps of an exemplary method, e.g., steps of the method of flowchart 900 of FIG. 8 and/or steps of the method of signaling diagram 200 of FIG. 2.

Assembly of components 1000 includes a component 1004 configured to operate the network communications device, through which communications passes, to monitor for an intercept provisioning message. Component 1004 includes a component 1006 configured to operate the network communications device to receive an encrypted target identifier identifying a communications target, and a component 1008 configured to operate the network communications device to receive time period information indicating a time period for which interception of the communication corresponding to the target is to be implemented.

Assembly of components 1000 further includes a component 1010 configured to store the encrypted target identifier in a storage device accessible to an operating system of the network communications device and an operating system administrator of the network communications device, a component 1012 configured to store the received time period information along with the encrypted target identifier in assert of secure target information ins said storage device accessible to an operating system of the network communications device, a component 1014 configured to load the encrypted target identifier into memory incurred in the network communications device used by an active communication interception application executing on a processor included in the network communication device, a component 1016 configured to operate the network communication device, under control of the interception application, to send a decryption request seeking decryption of the encrypted target identifier, identifying the communication interception target, to a security device, e.g., a USE, a component 1054 configured to operate the network communication device to receive an unencrypted version of the target identifier and to load the unencrypted target identified into the memory used by the active communications interception application with making the unencrypted version of the target identifier available to the operating system administrator of the network communications device, and a component 1062 configured to operate the network communications device to receive and store unencrypted (plain text versions) of the target identifiers received in response to the request(s) for decryption of the encrypted target identifiers in active memory of the network communications device which is being reset without storing the plain text versions of the target identifiers in the storage device accessible to the operating system administrator.

Assembly of components 1000 further includes a component 1056 configured to operate the network communications device to intercept communications passing through the network communications device corresponding to the target, a component 1056 configured to operate the network communication device to provide a copy of the intercepted communication to another device correspond to an entity authorized to access the intercepted communication correspond to the target, a component 1064 configured to operate the network communications device to intercept communications passing through the network communications device corresponding to target(s), a component 1066 configured to operate the network communication device to provide a copy of the intercepted communication to another device correspond to an entity authorized to access the intercepted communication correspond to a target, and a component 1024 configured to operate the network communication device to monitor for a reset including a component 1026 configured to detect a reset.

Assembly of components 1028 further includes a component 1028 configured to determine if there is a stored list of encrypted target identifies in the network communications device and to control operation as a function of the determination, a component 1030 configured to operate the network communications device to load the encrypted target identifier(s) from the stored list into memory include in the network communication device used by an active communication interception application executing on a processor include in the network communications device, and a component 1032 configured to operate the network communications device, under the control of the interception application, to send a decryption request seeking decryption of the encrypted target identifier(s), identifying the communications interception target(s), to the security device. Component 1032 includes a component 1034 configured to include an indicator in the decryption request indicating that the decryption request is in responses to a reset, e.g., a network communication device reset due to loss or power or due to a detected error condition or fault.

Figure 10:
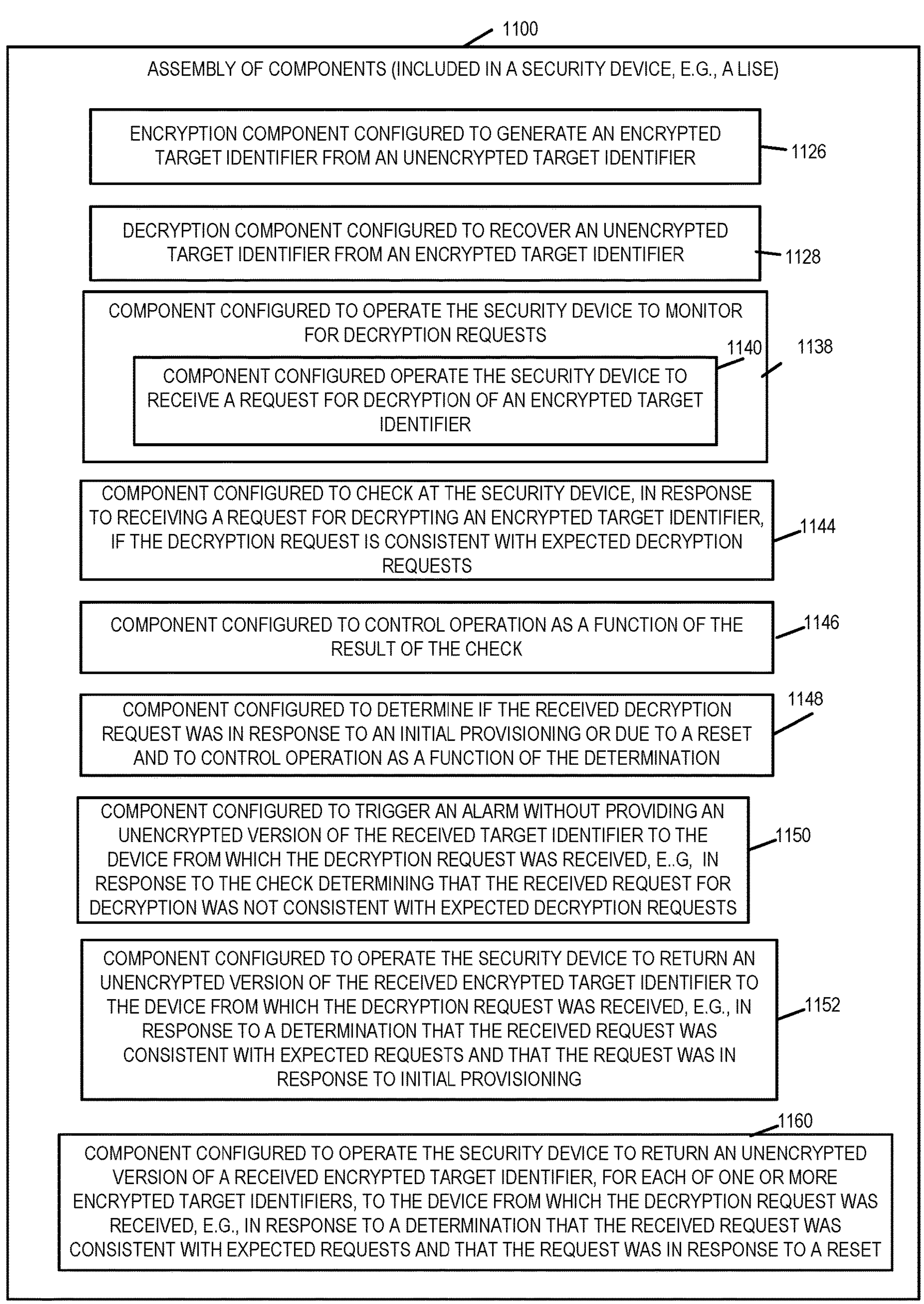
FIG. 10 is a drawing of an exemplary assembly of components which may be included in a security device, e.g., a LISE, in accordance with an exemplary embodiment.

FIG. 10 is a drawing of an exemplary assembly of components 1100 which may be included in a security device, e.g., a LISE, in accordance with an exemplary embodiment.

The components in the assembly of components 1100 can, and in some embodiments are, implemented fully in hardware within a processor, e.g., processor 702, e.g., as individual circuits. The components in the assembly of components 1100 can, and in some embodiments are, implemented fully in hardware within the assembly of hardware components 408, e.g., as individual circuits corresponding to the different components. In other embodiments some of the components are implemented, e.g., as circuits, within processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the security device 700, with the components controlling operation of security device 700 to implement the functions corresponding to the components when the components are executed by a processor e.g., processor 702. In some such embodiments, the assembly of components 1100 is included in the memory 712 as part of an assembly of software components 722. In still other embodiments, various components in assembly of components 1100 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 1100 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the security device 700 or elements therein such as the processor 702, to perform the functions of corresponding steps illustrated and/or described in the method of one or more of the flowcharts, signaling diagrams and/or described with respect to any of the Figures. Thus, the assembly of components 1100 includes various components that perform functions of corresponding one or more described and/or illustrated steps of an exemplary method, e.g., steps of the method of flowchart 900 of FIG. 8 and/or steps of the method of signaling diagram 200 of FIG. 2.

Assembly of components 1100 includes an encryption component 1126 configured to generate an encrypted target identifier from an unencrypted target identifier, a decryption component 1128 configured to recover an unencrypted target identifier from an encrypted target identifier, and a component 1138 configured to operate the security device to monitor for decryption requests. Component 1138 includes a component 1149 configured to operate the security device to receive a request for decryption of an encrypted target identifier.

Assembly of components 1100 further includes a component 1144 configured to check at the security device, in response to receiving a request for decrypting an encrypted target identifier, if the decryption request is consistent with expected decryption request, a component 1146 configured to control operation as a function of the result of the check of step 1144, a component 1148 configured to determine if the received decryption request was in response to an initial provisioning or due to a reset and to control operation as a function of the determination, a component 1150 configured to trigger an alarm without providing an unencrypted version of the received target identifier to the device from which the decryption request was received, e.g. in response to the check determining that that received request for decryption was not consistent with the expected decryption results, a component 1152 configured to operate the security device to return an unencrypted version of the received encrypted target identifier to the device from which the decryption request was received, e.g., in response to a determination that the received request was consistent with expected requests and that the request was in response to initial provisioning, and a 1154 configured to operate the security device to return an unencrypted version of the received encrypted target identifier, for each of one or more encrypted target identifiers, to the device from which the decryption request was received, e.g., in response to a determination that the received request was consistent with expected requests and that the request was in response to a reset.

Various aspects and/or features of some embodiments of the present invention are described below. The security device, which in some embodiments is or includes a Lawful Intercept Secrets Engine (LISE), is responsible for encryption and decryption of target identifiers. A network communications device, which may, and some time does, operate as a Point of Interception (POI), includes, in some cases, an interception application which when executed by a processor is used to generate a decryption request, which is sent to a security device, e.g., via a secure link.

Various embodiments, in accordance with the present invention include methods and apparatus to uniquely encrypt each subject of a lawful interception so that unauthorized personnel are not able to easily access interception targets, e.g., a system administrator of the network communications device does not have access to the memory in which the unencrypted target identifiers are stored. With encryption, it becomes significantly more difficult for unauthorized personnel to determine a target list.

The current approach to target interception is unencrypted and relies on the underlying system security to keep the list secret. Various exemplary methods and apparatus, in accordance with the present invention, include a Secrets Engine and assumes that the underlying system is insecure.

The central idea centers around the Lawful Intercept Secrets Engine (LISE). The LISE sits within the same security realm as the Lawful Intercept Administration Function (ADMF) and provides an encryption function throughout the Lawful Intercept (LI) ecosystem. A target will be installed using plain text to the ADMF. The ADMF will then make an encryption request to the LISE using plain text. The LISE will then return ciphertext. The ADMF will then take the ciphertext and use it instead of the plaintext to provision the Points of Interception (POI). The POI will keep the ciphertext in an internal database and sent a decryption request to the LISE. The LISE will determine if the POI is authorized to decrypt and send the plaintext target back to the POI to reside in memory only. This way the target is only unencrypted in memory and not stored anywhere in the system. An attacker would need to gain access to the POI active memory to determine the target list rather than just looking in the database.

Numbered List of Exemplary Method Embodiments:

Method Embodiment 1. A communications interception method, the method comprising: receiving (224 or 906), at a network communications device (104) through which communication passes, an encrypted first target identifier (e.g., cipher text) identifying a first communications interception target (e.g., UE 1 118); storing (226 or 910) the encrypted first target identifier in a storage device (112) accessible to an operating system of the network communications device and an operating system administrator of the network communications device (104); loading (226/240 or 914) the encrypted first target identifier into memory (e.g., RAM) (114) included in the network communications device (104) used by an active communications interception application executing on a processor included in the network communications device (104); operating (242 or 916) the network communications device (104), under control of the interception application, to send a decryption request (244) seeking decryption of the encrypted first target identifier, identifying the first communications interception target, to a security device (e.g., a LISE) (108 including 110); and operating the network communications device (104) to receive (254 or 954) an unencrypted version (plain text version of target identifier) (252) of the first target identifier (e.g. from the security device (108)) and to load (256 or 954) the unencrypted version of the first target identifier into said memory (114) used by active communications interception application without making the unencrypted version of the first target identifier available to the operating system administrator of the network communications device (104).

Method Embodiment 2. The communications interception method of Method Embodiment 1, further comprising: operating (266 or 956) the network communications device to intercept (e.g., duplicate) communications passing through the network communications device (104) corresponding to the first target (118); and operating (270 or 958) the network communications device (104) to provide a copy of the intercepted communications (274) to another device (e.g., an administrative device 106 or law enforcement node 116) corresponding to an entity (law enforcement) authorized to access the intercepted communications corresponding to the first target (118).

Method Embodiment 3. The communications interception method of Method Embodiment 2, wherein the encrypted first target identifier is a cipher text version of a plain text identifier identifying the first interception target (118); and wherein the security device (108) is an Lawful Intercept Secrets Engine (LISE) (110).

Method Embodiment 4. The communications interception method of Method Embodiment 3, further comprising: receiving (224 or 908) (e.g. along with the encrypted first target identifier) at the network communications device (104) time period information (e.g., validity duration or time interval during which interception is to be implemented) indicating a time period for which interception of communications corresponding to the first target (118) is to be implemented.

Method Embodiment 5. The communications interception method of Method Embodiment 4, further comprising: storing (228 or 902) the received time period information along with the encrypted first target identifier in a set of secure target information (428) in said storage device (112) accessible to an operating system of the network communications device (104).

Method Embodiment 6. The communications interception method of Method Embodiment 5, further comprising: checking ((248, 288, or 324) or 944), at the security device (108), in response to receiving ((246, 286, or 322) or 940) a request for decryption of an encrypted target identifier (244, 284, or 320) (e.g., the first encrypted target identifier), if the decryption request is consistent with expected decryption requests (e.g., is the received decryption request from a device which was sent an encrypted target identifier and is it within the period for which the target is to be monitored and/or is the request part of a set of decryption requests corresponding to a network communications device reset).

Method Embodiment 7. The communications interception method of Method Embodiment 6, further comprising: responding, at the security device, to the received request for decryption of an encrypted target identifier by: i) returning (250 or 952 or 960) an unencrypted version of the received encrypted target identifier (252) to the device from which the decryption request was received when it is determined that said received request for decryption of the encrypted target identifier is consistent with expected decryption requests; or ii) triggering (290 or 950) an alarm (e.g., Email alert to an administrator or law enforcement system) without providing an unencrypted version of the received target identifier to the device from which the description request was received when it is determined that said received request for decryption of the encrypted target identifier is not consistent with expected decryption requests.

Method Embodiment 8. The communications interception method of Method Embodiment 7, wherein decrypted target identifiers (304) are stored in active memory (114) which is not accessible to the operating system administrator of the communications device and wherein encrypted target identifiers (302) are stored in the storage device (112) accessible to the operating system and operating system administrator, the method further comprising: in response to a reset (310 or 926) of the network communications device (104) sending (326 or 932) requests (320) for decryption of encrypted target identifiers stored in the storage device accessible to the operating system; and storing (332 or 962) plain text versions of the target identifiers received in response to the requests for decryption of the encrypted target identifiers in active memory of the network communications device which is being reset without storing the plain text versions of the target identifiers in the storage device accessible to the operating system administrator.

Method Embodiment 9. The communications interception method of Method Embodiment 3, wherein the network communications device is one of: a router or a switch (e.g., a telephone switch or an optical switch).

Method Embodiment 10. The communications interception method of Method Embodiment 3, wherein the network communication device implements one or more of: a user plane function (UPF), a session management function (SMF) or an access and mobility management function (AMF).

Numbered List of Exemplary System Embodiments:

System Embodiment 1. A communication system (100) comprising: a network communications device (104 or 400), through which communications passes, including: a storage device (112), accessible to an operating system of the network communications device and an operating system administrator of the network communications device (104); a memory (e.g., RAM) (114) used by an active communications interception application executing on a processor included in the network communications device (104); and a first processor (402) configured to: operate the network communications device to receive (224 or 906) (e.g., via receiver 414) an encrypted first target identifier (e.g., cipher text) identifying a first communications interception target (e.g., UE 1 118); store (226 or 910) the encrypted first target identifier in the storage device (112); load (226/240 or 914) the encrypted first target identifier into memory (114); operate (242 or 916) the network communications device (104), under control of the interception application, to send (e.g., via transmitter 416) a decryption request (244) seeking decryption of the encrypted first target identifier, identifying the first communications interception target, to a security device (e.g., a LISE) (108 or 700 including 110); and operate the network communications device (104) to receive (254 or 954) (e.g., via receiver 414) an unencrypted version (plain text version of target identifier) (252) of the first target identifier (e.g. from the security device (108)) and to load (256 or 954) the unencrypted version of the first target identifier into said memory (114) used by active communications interception application without making the unencrypted version of the first target identifier available to the operating system administrator of the network communications device (104).

System Embodiment 2. The communications system of System Embodiment 1, wherein said first processor (402) is further configured to: operate (266 or 956) the network communications device to intercept (e.g., duplicate) communications passing through the network communications device (104) corresponding to the first target (118); and operate (270 or 958) the network communications device (104) to provide a copy of the intercepted communications (274) to another device (e.g., an administrative device 106 or law enforcement node 116) corresponding to an entity (law enforcement) authorized to access the intercepted communications corresponding to the first target (118).

System Embodiment 3. The communications system of System Embodiment 2, wherein the encrypted first target identifier is a cipher text version of a plain text identifier identifying the first interception target (118); and wherein the security device (108) is an Lawful Intercept Secrets Engine (LISE) (110).

System Embodiment 4. The communications system of System Embodiment 3, wherein said first processor (402) is further configured to operate the network communications device to: receive (224 or 908) (e.g. along with the encrypted first target identifier) at the network communications device (104) time period information (e.g., validity duration or time interval during which interception is to be implemented) indicating a time period for which interception of communications corresponding to the first target (118) is to be implemented.

System Embodiment 5. The communications system of System Embodiment 4, wherein said first processor (402) is further configured to: store (228 or 902) the received time period information along with the encrypted first target identifier in a set of secure target information (428) in said storage device (112) accessible to an operating system of the network communications device (104).

System Embodiment 6. The communications system of System Embodiment 5, further comprising: said security device (108 or 700), said security device including a second processor (702); and wherein said second processor (702) is configured to: operate the security device (108 or 700) to check ((248, 288, or 324) or 944), in response to receiving ((246, 286, or 322) or 940) a request for decryption of an encrypted target identifier (244, 284, or 320) (e.g., the first encrypted target identifier), if the decryption request is consistent with expected decryption requests (e.g., is the received decryption request from a device which was sent an encrypted target identifier and is it within the period for which the target is to be monitored and/or is the request part of a set of decryption requests corresponding to a network communications device reset).

System Embodiment 7. The communications system of System Embodiment 6, wherein said second processor (702) is further configured to: operate the security device to respond to the received request for decryption of an encrypted target identifier by: i) returning (250 or 952 or 960) an unencrypted version of the received encrypted target identifier (252) to the device from which the decryption request was received when it is determined that said received request for decryption of the encrypted target identifier is consistent with expected decryption requests; or ii) triggering (290 or 950) an alarm (e.g., Email alert to an administrator or law enforcement system) without providing an unencrypted version of the received target identifier to the device from which the description request was received when it is determined that said received request for decryption of the encrypted target identifier is not consistent with expected decryption requests.

System Embodiment 8. The communications system of System Embodiment 7, wherein decrypted target identifiers (304) are stored in active memory (114) which is not accessible to the operating system administrator of the communications device and wherein encrypted target identifiers (302) are stored in the storage device (112) accessible to the operating system and operating system administrator, and wherein said first processor (402) is configured to: in response to a reset (310 or 926) of the network communications device (104), operate the network communications device to send (326 or 932) requests (320) for decryption of encrypted target identifiers stored in the storage device accessible to the operating system; and store (332 or 962) plain text versions of the target identifiers received in response to the requests for decryption of the encrypted target identifiers in active memory of the network communications device which is being reset without storing the plain text versions of the target identifiers in the storage device accessible to the operating system administrator.

System Embodiment 9. The communications system of System Embodiment 3, wherein the network communications device is one of: a router or a switch (e.g., a telephone switch or an optical switch).

System Embodiment 10. The communications system of System Embodiment 3, wherein the network communication device implements one or more of: a user plane function (UPF), a session management function (SMF) or an access and mobility management function (AMF).

Non-Transitory Computer Readable Medium Embodiment

Non-Transitory Computer Readable Medium Embodiment 1. A non-transitory computer readable medium (410) including machine executable instructions which when executed by a processor (402) of a network communications device (104 or 400), through which communications passes, control the network communications device to perform the steps of: receiving (224 or 906), at the network communications device (104) through which communication passes, an encrypted first target identifier (e.g., cipher text) identifying a first communications interception target (e.g., UE 1 118); storing (226 or 910) the encrypted first target identifier in a storage device (112) accessible to an operating system of the network communications device and an operating system administrator of the network communications device (104); loading (226/240 or 914) the encrypted first target identifier into memory (e.g., RAM) (114) included in the network communications device (104) used by an active communications interception application executing on a processor included in the network communications device (104); operating (242 or 916) the network communications device (104), under control of the interception application, to send a decryption request (244) seeking decryption of the encrypted first target identifier, identifying the first communications interception target, to a security device (e.g., a LISE) (108 including 110); and operating the network communications device (104) to receive (254 or 954) an unencrypted version (plain text version of target identifier) (252) of the first target identifier (e.g. from the security device (108)) and to load (256 or 954) the unencrypted version of the first target identifier into said memory (114) used by active communications interception application without making the unencrypted version of the first target identifier available to the operating system administrator of the network communications device (104).

Various embodiments are directed to apparatus, e.g., network communications devices such as routers, switches, etc., administrator devices, security devices, e.g. a LISE, law enforcement nodes, user devices such as a user equipment (UE) device, mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating network communications devices such as routers, switches, etc., administrator devices, security devices, e.g. a LISE, law enforcement nodes, user devices, base stations, e.g., eNB and CBSDs, gateways, servers (HSS server), MMEs, SAS, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

In various embodiments encryption is used a a cryptographic function to protect the identity of targets. In cryptography, ciphertext or cyphertext is the result of encryption performed on plaintext using an algorithm, called a cipher. Ciphertext is also known as encrypted or encoded information because it contains a form of the original plaintext that is unreadable by a human or computer without the proper cipher to decrypt it. Thus preventing loss of sensitive information via hacking. Decryption, the inverse of encryption, is the process of turning ciphertext into readable plaintext.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a network communications device such as router, switch, etc., an administrator device, a security device, e.g. a LISE, a law enforcement node, a MVNO base station such as a CBRS base station, e.g., a CBSD, a device such as a cellular base station e.g., an eNB, a MNO HSS server, a MVNO HSS server, a UE device, a relay device, e.g. a MME, SAS, etc., said device including a processor configured to implement one, multiple or all of the steps of one or more methods of the invention.

In some embodiments, the processor or processors, e.g., CPUs, of one or more devices, e.g., communications nodes such as e.g., network communications devices such as routers, switches, etc., administrator devices, security devices, e.g. a LISE, law enforcement nodes, a MVNO base station such as a CBRS base station, e.g. a CBSD, an device such as a cellular base station e.g., an eNB, a MNO HSS server, a MVNO HSS device server, a UE device, a relay device, e.g. a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a network communications device such as router, switch, etc., administrator device, security device, e.g. a LISE, a law enforcement node, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., as e.g., a network communications device such as router, switch, etc., administrator device, security device, e.g. a LISE, a law enforcement node, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a network communications device such as router, switche, etc., administrator device, security device, e.g. a LISE, law enforcement node, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications interception method, the method comprising:

operating a network communications device to store an encrypted first target identifier corresponding to a target device in a storage device accessible to at least one of: i) an operating system of the network communications device or ii) an operating system administrator of the network communications device, said network communications device being a separate device from the target device through which communications to the target device pass;

operating the network communications device to load the encrypted first target identifier into memory included in the network communications device used by an active communications interception application;

operating the network communications device to send a decryption request seeking decryption of the encrypted first target identifier to a security device; and operating the network communications device to receive an unencrypted version of the first target identifier from the security device and, under control of a processor in the network communications device, load the unencrypted version of the first target identifier into a secure area of said memory used by the active communications interception application without making the unencrypted version of the first target identifier available to the operating system administrator of the network communications device, said secure area of memory being an area of memory which is not accessible to the operating system administrator of the network communications device.

2. The communications interception method of claim 1, further comprising:

operating the network communications device to intercept communications passing through the network communications device corresponding to the first communications interception target; and operating the network communications device to provide a copy of the intercepted communications to another device corresponding to an entity authorized to access the intercepted communications corresponding to the first communications interception target.

3. The communications interception method of claim 2, wherein the encrypted first target identifier is a cipher text version of a plain text identifier identifying the first communications interception target; and wherein the security device is a Lawful Intercept Secrets Engine (LISE).

4. The communications interception method of claim 3, further comprising:

receiving at the network communications device time period information indicating a time period for which interception of communications corresponding to the first communications interception target is to be implemented.

5. The communications interception method of claim 4, further comprising:

storing the received time period information along with the encrypted first target identifier in a set of secure target information in said storage device accessible to an operating system of the network communications device.

6. The communications interception method of claim 5, further comprising:

checking, at the security device, in response to receiving a request for decryption of an encrypted target identifier, if the decryption request is consistent with expected decryption requests.

7. The communications interception method of claim 6, further comprising:

responding, at the security device, to the received request for decryption of an encrypted target identifier by:

i) returning an unencrypted version of the received encrypted target identifier to the device from which the decryption request was received when it is determined that said received request for decryption of the encrypted target identifier is consistent with expected decryption requests; or ii) triggering an alarm without providing an unencrypted version of the received target identifier to the device from which the decryption request was received when it is determined that said received request for decryption of the encrypted target identifier is not consistent with expected decryption requests.

8. The communications interception method of claim 7, wherein decrypted target identifiers are stored in active memory which is not accessible to the operating system administrator of the communications device and wherein encrypted target identifiers are stored in the storage device accessible to the operating system and operating system administrator, the method further comprising:

in response to a reset of the network communications device sending requests for decryption of encrypted target identifiers stored in the storage device accessible to the operating system; and storing plain text versions of the target identifiers received in response to the requests for decryption of the encrypted target identifiers in active memory of the network communications device which is being reset without storing the plain text versions of the target identifiers in the storage device accessible to the operating system administrator.

9. The communications interception method of claim 1, wherein the security device is a separate device from the network communications device; and wherein the first target identifier corresponds to a User Equipment (UE) device which is a separate device from the network communications device; and wherein the network communications device is one of: a router or a switch.

10. The communications interception method of claim 3, wherein the network communication device implements one or more of: a user plane function (UPF), a session management function (SMF) or an access and mobility management function (AMF).

11. The method of claim 1, wherein said storage device is separate from said memory.

12. The method of claim 1, wherein said network communications device is a device located at a point of communications interception which includes said storage device and said memory, said storage device being different from said memory, the method further comprising:

operating the network communications device to intercept communications passing through the network communications device corresponding to the first communications interception target.

13. A communication system comprising:

a network communications device, through which communications pass to a target device, including:

a storage device, accessible to at least one of i) an operating system of the network communications device or ii) an operating system administrator of the network communications device;

a memory used by an active communications interception application executed on a first processor included in the network communications device; and said first processor configured to:

store an encrypted first target identifier corresponding to the target device in the storage device;

load the encrypted first target identifier into the memory;

operate the network communications device to send a decryption request seeking decryption of the encrypted first target identifier to a security device; and operate the network communications device to receive an unencrypted version of the first target identifier and to load the unencrypted version of the first target identifier into a secure portion of said memory used by active communications interception application without making the unencrypted version of the first target identifier available to the operating system administrator of the network communications device, said secure area of memory being an area of memory which is not accessible to the operating system administrator of the network communications device.

14. The communications system of claim 13, wherein said first processor is further configured to:

operate the network communications device to intercept communications passing through the network communications device corresponding to the first communications interception target; and operate the network communications device to provide a copy of the intercepted communications to another device corresponding to an entity authorized to access the intercepted communications corresponding to the first communications interception target.

15. The communications system of claim 14, wherein the encrypted first target identifier is a cipher text version of a plain text identifier identifying the first communications interception target; and wherein the security device is a Lawful Intercept Secrets Engine (LISE).

16. The communications system of claim 15, wherein said first processor is further configured to operate the network communications device to:

receive at the network communications device time period information indicating a time period for which interception of communications corresponding to the first communications interception target is to be implemented.

17. The communications system of claim 16, wherein said first processor is further configured to:

store the received time period information along with the encrypted first target identifier in a set of secure target information in said storage device accessible to an operating system of the network communications device.

18. The communications system of claim 17, further comprising:

said security device, said security device including a second processor; and wherein said second processor is configured to:

operate the security device to check, in response to receiving a request for decryption of an encrypted target identifier, if the decryption request is consistent with expected decryption requests.

19. The communications system of claim 18, wherein said second processor is further configured to:

operate the security device to respond to the received request for decryption of an encrypted target identifier by:

i) returning an unencrypted version of the received encrypted target identifier to the device from which the decryption request was received when it is determined that said received request for decryption of the encrypted target identifier is consistent with expected decryption requests; or ii) triggering an alarm without providing an unencrypted version of the received target identifier to the device from which the decryption request was received when it is determined that said received request for decryption of the encrypted target identifier is not consistent with expected decryption requests.

20. The communications system of claim 19, wherein decrypted target identifiers are stored in active memory which is not accessible to the operating system administrator of the communications device and wherein encrypted target identifiers are stored in the storage device accessible to the operating system and operating system administrator, and wherein said first processor is configured to:

in response to a reset of the network communications device, operate the network communications device to send requests for decryption of encrypted target identifiers stored in the storage device accessible to the operating system; and store plain text versions of the target identifiers received in response to the requests for decryption of the encrypted target identifiers in active memory of the network communications device which is being reset without storing the plain text versions of the target identifiers in the storage device accessible to the operating system administrator.

21. The communication system of claim 13, wherein said storage device is separate from said memory.

22. The communications system of claim 13, wherein the security device is a separate device from the network communications device; and wherein the network communications device is one of: a router or a switch.

23. A non-transitory computer readable medium including machine executable instructions which when executed by a processor of a network communications device, through which communications pass to a target device, control the network communications device to perform the steps of:

storing the encrypted first target identifier corresponding to the target device in a storage device accessible to at least one of: i) an operating system of the network communications device or ii) an operating system administrator of the network communications device;

loading the encrypted first target identifier into memory included in the network communications device;

operating the network communications device to send a decryption request seeking decryption of the encrypted first target identifier to a security device; and operating the network communications device to receive an unencrypted version of the first target identifier and to load the unencrypted version of the first target identifier into a secure area of said memory used by an active communications interception application without making the unencrypted version of the first target identifier available to the operating system administrator of the network communications device, said secure area of memory being an area of memory which is not accessible to the operating system administrator of the network communications device.

24. The method of claim 11, wherein said memory is volatile memory.

25. The method of claim 24, wherein said storage device is a non-volatile storage device.

26. The communication system of claim 21, wherein said memory is volatile memory; and wherein said storage device is a non-volatile storage device.

* * * * *